United States Patent
Sambamurthy et al.

(10) Patent No.: US 9,852,275 B2
(45) Date of Patent: *Dec. 26, 2017

(54) SECURITY DEVICE, METHODS, AND SYSTEMS FOR CONTINUOUS AUTHENTICATION

(71) Applicant: NSS Lab Works LLC, Saratoga, CA (US)

(72) Inventors: Namakkal S. Sambamurthy, Saratoga, CA (US); Parthasarathy Krishnan, Cupertino, CA (US)

(73) Assignee: NSS Lab Works LLC, Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/844,358

(22) Filed: Mar. 15, 2013

(65) Prior Publication Data

US 2014/0283016 A1    Sep. 18, 2014

(51) Int. Cl.
*H04L 29/06* (2006.01)
*G06F 21/31* (2013.01)
*G06F 21/32* (2013.01)

(52) U.S. Cl.
CPC .............. *G06F 21/31* (2013.01); *G06F 21/32* (2013.01); *G06F 2221/2101* (2013.01); *G06F 2221/2153* (2013.01)

(58) Field of Classification Search
CPC ........ G06F 21/575; G06F 21/83; G06F 21/31; G06F 21/32; G06F 2221/2153; G06F 2221/2101
See application file for complete search history.

(56) References Cited

U.S. PATENT DOCUMENTS 5,229,764 A    7/1993    Matchett et al.
5,915,973 A    6/1999    Hoehn-Saric et al.
(Continued)

FOREIGN PATENT DOCUMENTS

JP        2001313006     9/2001
WO    WO 2007/062121    5/2007

OTHER PUBLICATIONS

Spectorsoft "Investigate Employees You Suspect of PC and Internet Abuse", http://www.spectorcne.com, Aug. 16, 2010, pp. 1-4.
(Continued)

*Primary Examiner* — Ghodrat Jamshidi
(74) *Attorney, Agent, or Firm* — Martine Penilla Group, LLP

(57) ABSTRACT

Methods, systems, and computer programs are presented for securing a computing device. One security device includes a processor, memory and a connector. The memory includes a computer program that, when executed by the processor, performs a method. The method includes operations for detecting that the connector is coupled to a second computing device, and for determining a user associated with the security computing device. In addition, the method includes operations for receiving periodic images from an image capture device coupled to the second computing device, and for performing continuous authentication operations to validate an identification of the user based on the periodic images. The user is disabled from using the second computing device after an authentication operation fails.

19 Claims, 24 Drawing Sheets

(56) References Cited

U.S. PATENT DOCUMENTS

| | | | |
|---|---|---|---|
| 6,111,517 A | 8/2000 | Atick et al. | |
| 7,039,221 B1 | 5/2006 | Tummey et al. | |
| 7,134,130 B1* | 11/2006 | Thomas | 725/25 |
| 7,460,149 B1 | 12/2008 | Donovan et al. | |
| 7,612,901 B2* | 11/2009 | Asahara | G03G 15/50 358/1.13 |
| 7,940,929 B1 | 5/2011 | Sengupta | |
| 8,024,779 B2 | 9/2011 | John et al. | |
| 8,219,021 B2 | 7/2012 | Rogers et al. | |
| 8,261,090 B1 | 9/2012 | Matsuoka | |
| 8,272,053 B2 | 9/2012 | Markham et al. | |
| 8,484,355 B1 | 7/2013 | Lochhead et al. | |
| 9,147,047 B1* | 9/2015 | Grun | G06F 21/00 |
| 2002/0083342 A1 | 6/2002 | Webb et al. | |
| 2002/0095507 A1 | 7/2002 | Jerdonek | |
| 2002/0172931 A1 | 11/2002 | Greene et al. | |
| 2003/0051161 A1 | 3/2003 | Smith et al. | |
| 2004/0010720 A1 | 1/2004 | Singh et al. | |
| 2004/0078569 A1 | 4/2004 | Hotti | |
| 2005/0057339 A1 | 3/2005 | Ikehara et al. | |
| 2006/0242254 A1 | 10/2006 | Okazaki et al. | |
| 2006/0288234 A1* | 12/2006 | Azar et al. | 713/186 |
| 2007/0048723 A1 | 3/2007 | Brewer et al. | |
| 2007/0112775 A1 | 5/2007 | Ackerman | |
| 2007/0186106 A1 | 8/2007 | Ting et al. | |
| 2007/0277061 A1 | 11/2007 | Ashe | |
| 2007/0300179 A1 | 12/2007 | Friedlander | |
| 2008/0102435 A1 | 5/2008 | Rogers et al. | |
| 2009/0080716 A1 | 3/2009 | Yanagi | |
| 2009/0133051 A1* | 5/2009 | Hildreth | 725/28 |
| 2009/0185723 A1 | 7/2009 | Kurtz et al. | |
| 2009/0313495 A1 | 12/2009 | Krishnan et al. | |
| 2010/0111363 A1* | 5/2010 | Kelly | G06F 21/316 382/103 |
| 2010/0205667 A1* | 8/2010 | Anderson et al. | 726/19 |
| 2010/0263035 A1 | 10/2010 | Tock et al. | |
| 2010/0295944 A1 | 11/2010 | Takeuchi et al. | |
| 2010/0323608 A1 | 12/2010 | Sanhedrai et al. | |
| 2011/0087766 A1 | 4/2011 | Kuo et al. | |
| 2011/0128384 A1 | 6/2011 | Tiscareno et al. | |
| 2011/0177484 A1 | 7/2011 | Morgan et al. | |
| 2011/0223576 A1 | 9/2011 | Foster et al. | |
| 2011/0244440 A1 | 10/2011 | Saxon et al. | |
| 2011/0265156 A1* | 10/2011 | Bombay | 726/5 |
| 2012/0034584 A1 | 2/2012 | Logan et al. | |
| 2012/0042358 A1 | 2/2012 | Kondur et al. | |
| 2012/0077176 A1 | 3/2012 | Foster et al. | |
| 2012/0077177 A1 | 3/2012 | Foster et al. | |
| 2012/0098793 A1 | 4/2012 | Cheng | |
| 2012/0124559 A1 | 5/2012 | Kondur | |
| 2013/0096916 A1 | 4/2013 | Pemmaraju | |
| 2013/0110565 A1* | 5/2013 | Means, Jr. | G06Q 10/063 705/7.11 |
| 2013/0120134 A1* | 5/2013 | Hicks, III | G08B 25/004 340/501 |
| 2013/0147972 A1 | 6/2013 | Niinuma et al. | |
| 2013/0148850 A1 | 6/2013 | Matsuda et al. | |
| 2014/0013422 A1 | 1/2014 | Janus et al. | |
| 2014/0150071 A1 | 5/2014 | Castro et al. | |
| 2014/0150072 A1 | 5/2014 | Castro et al. | |
| 2014/0222995 A1 | 8/2014 | Razden et al. | |

OTHER PUBLICATIONS

Imonitor EAM "Computer and Internet Monitoring Software, Keylogger, Spy Software for Employee Monitoring & Employee Time Tracking", http://www.imonitorsoft.com, Aug. 16, 2010, pp. 1-2.

Observeit 'Monitoring TS, Citrix, Vmware and SSH sessions, http://www.observeit-sys.com/Products/How_It_Works, Sep. 4, 2011, pp. 1-2

Klosterman et al. "Secure Continuous Biometric-Enhanced Authentication", School of Computer Science, Carnegie Mellon University, Pittsburgh, PA 15213, May 2000, pp. 1-27.

* cited by examiner

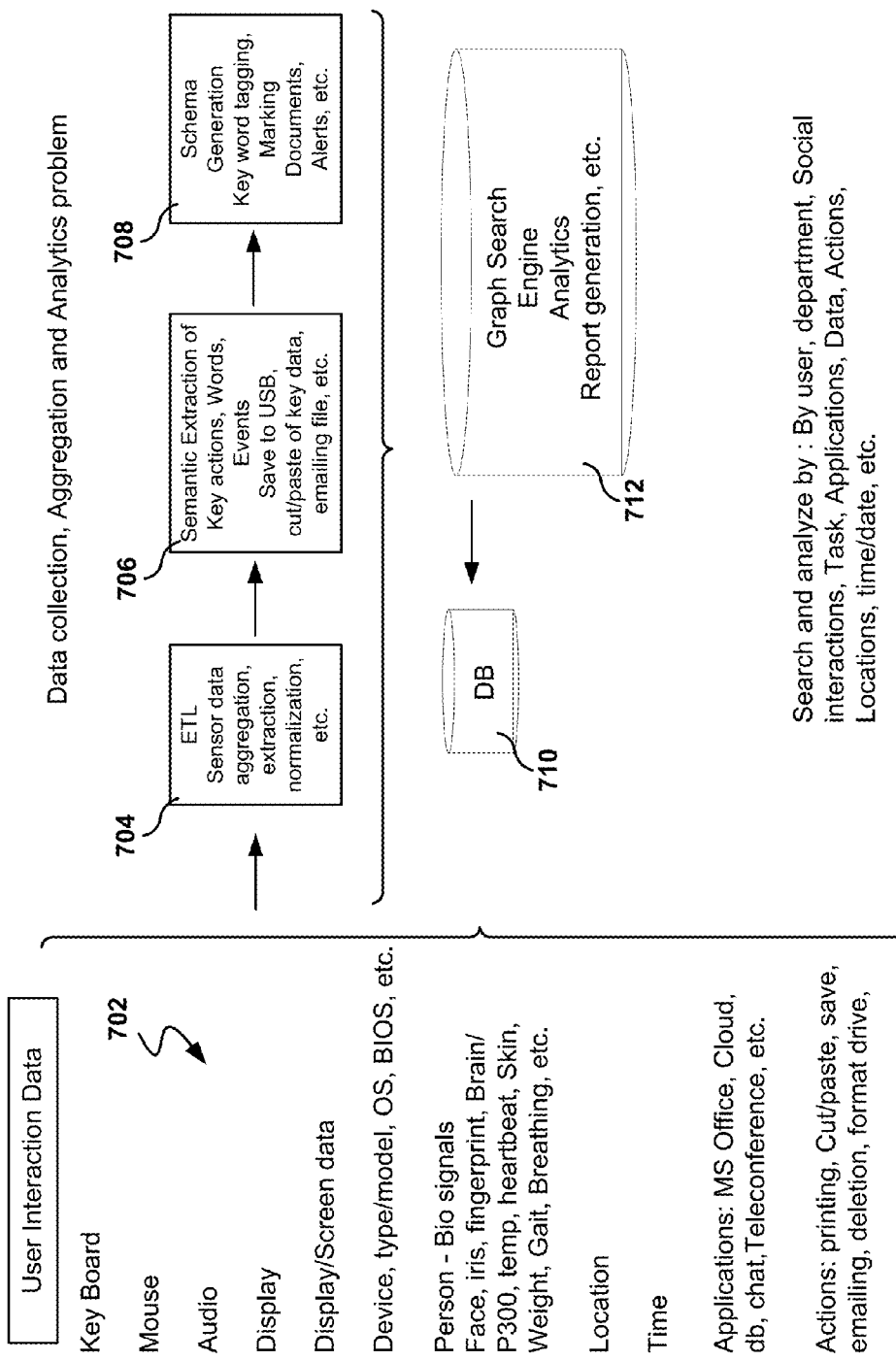

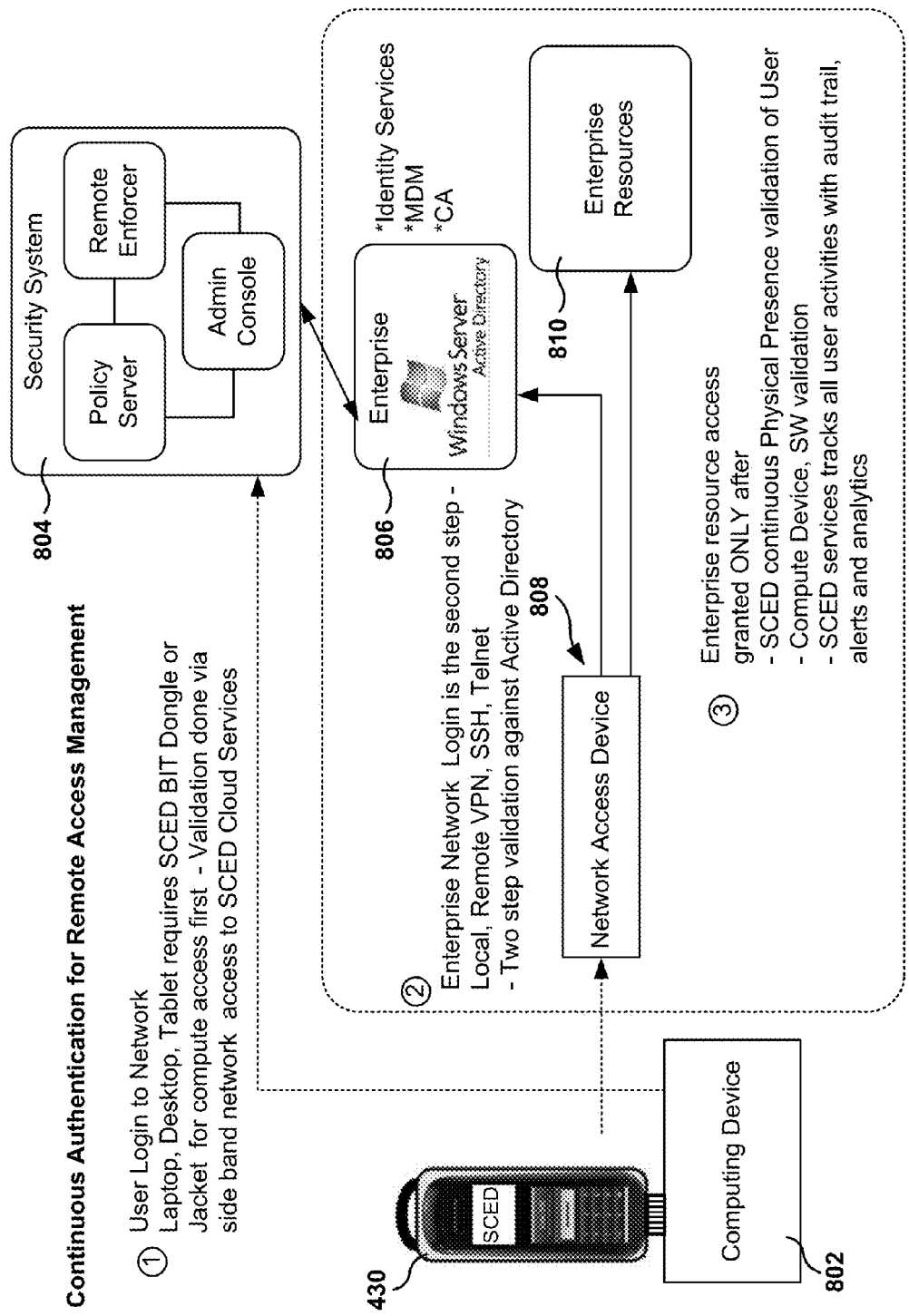

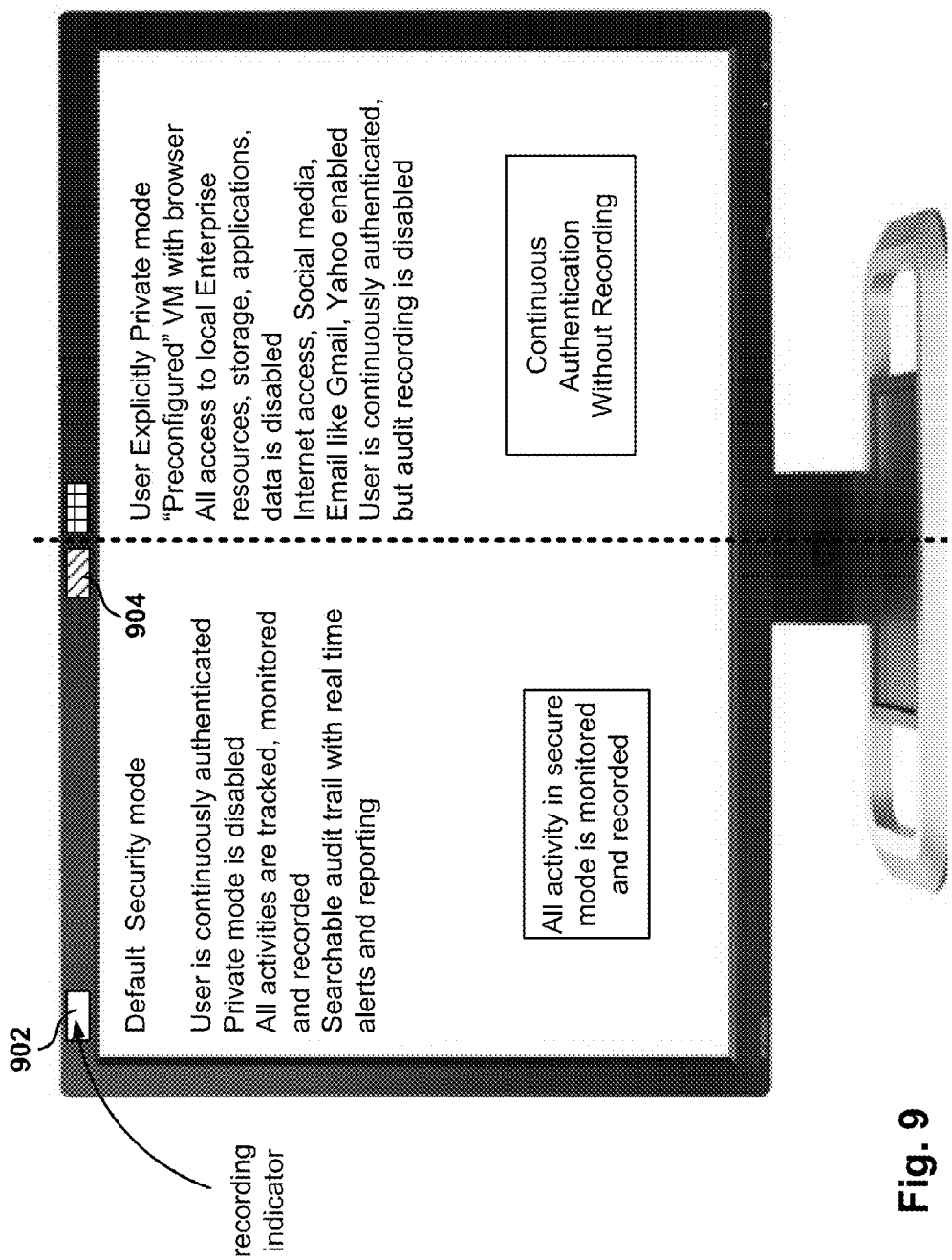

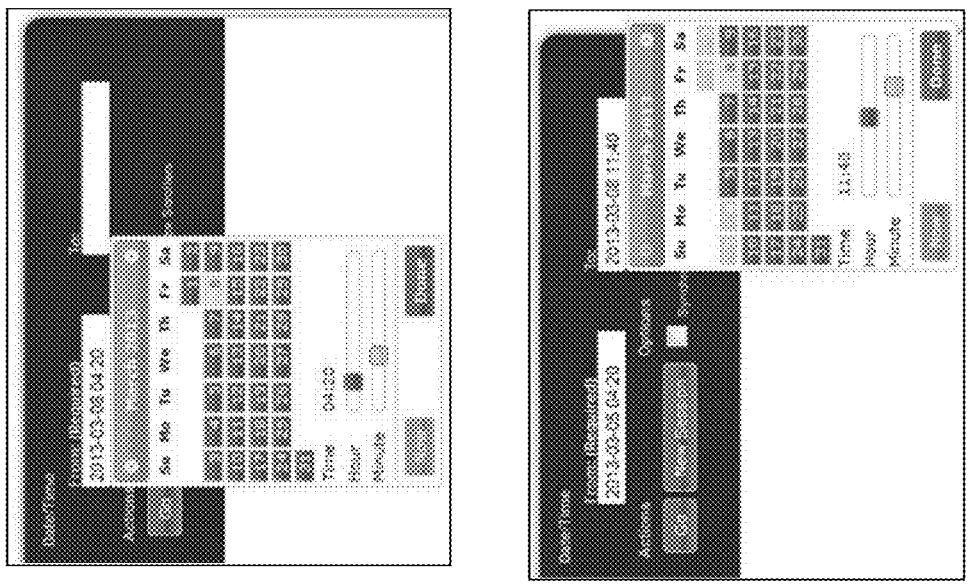
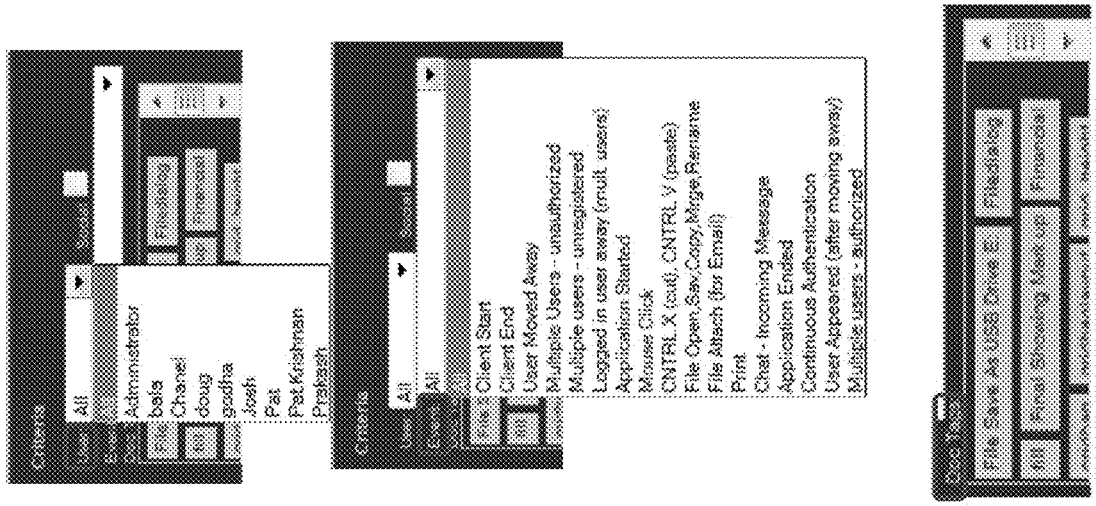
Fig. 10B

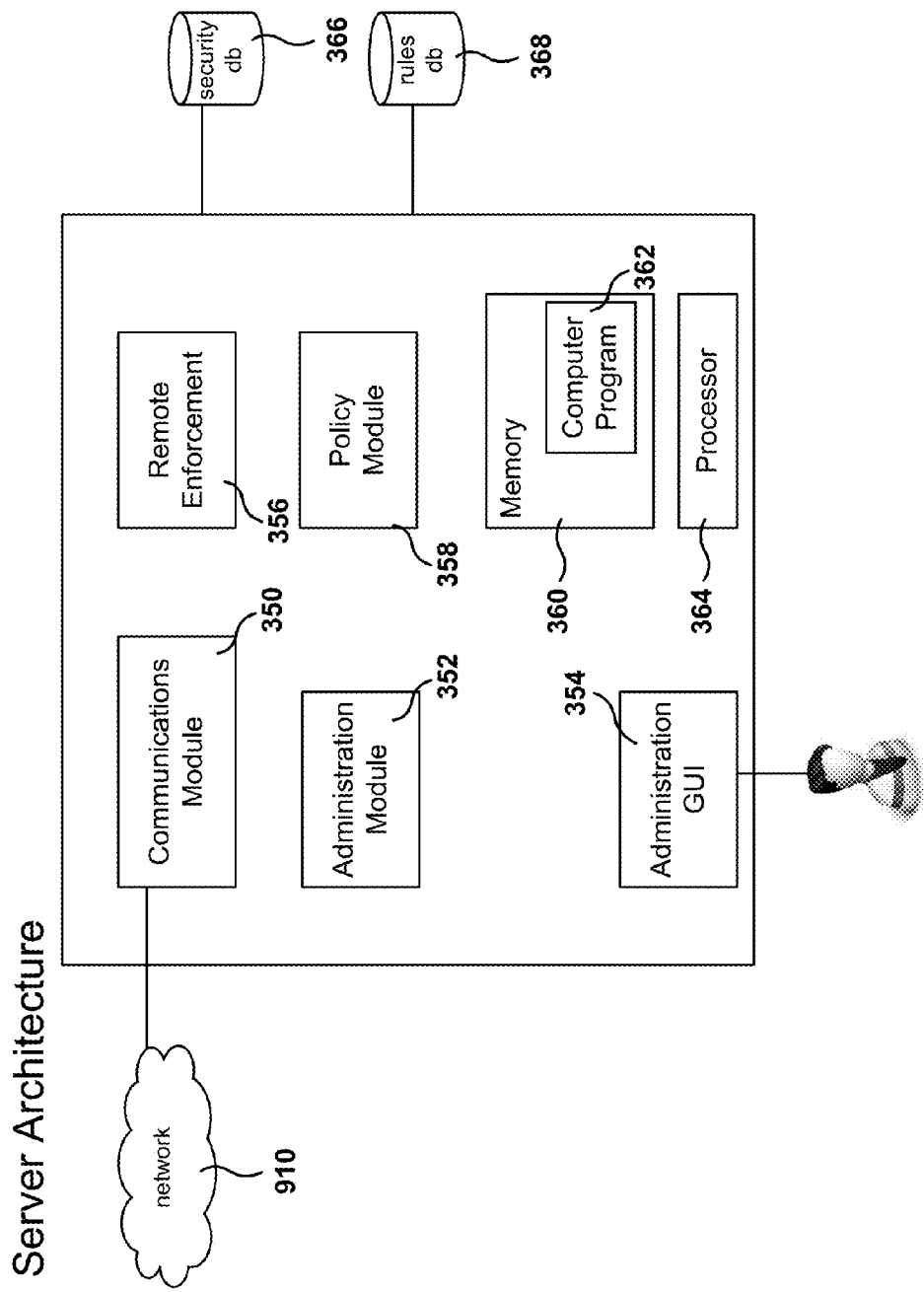

SECURITY DEVICE, METHODS, AND SYSTEMS FOR CONTINUOUS AUTHENTICATION

CROSS REFERENCE TO RELATED APPLICATIONS

This application is related to U.S. patent application Ser. No. 13/444,840, filed Apr. 11, 2012, and entitled "Secure Display System for Prevention of Information Copying from any Display Screen System," which claims priority from U.S. Provisional Patent Application No. 61/474,255, filed Apr. 11, 2011, and entitled "Secure Display System for Prevention of Information Copying from any Display Screen System," all of which are incorporated herein by reference.

CROSS REFERENCE TO RELATED APPLICATIONS

This application is related by subject matter to U.S. patent application Ser. No. 13/844,274 filed on the same day as the instant application and entitled "Continuous Monitoring of Computer User and Computer Activities;" and U.S. patent application Ser. No. 13/844,427 filed on the same day as the instant application and entitled "Ongoing Authentication and Access Control with Network Access Device", all of which are incorporated herein by reference.

BACKGROUND

1. Field of the Invention

The present embodiments relate to devices, methods, systems, and computer programs for improving security, and more particularly to devices, methods, systems, and computer programs for improving security utilizing continuous user authentication.

2. Description of the Related Art

Rapid evolution of technology and mass adoption of cheap devices, such as tablets and electronic readers with high definition displays, digital cameras, 3D printers, 3D scanners, high capacity flash storage cards with embedded WiFi, etc., and the widespread availability of Internet services have introduced challenges to businesses and individuals to protect, preserve, and enhance their intellectual property and intellectual assets.

It is in this context that embodiments arise.

SUMMARY

Devices, methods, computer programs, and systems are presented for securing a computing device in use by a user. It should be appreciated that the present embodiments can be implemented in numerous ways, such as a method, an apparatus, a system, a device, or a computer program on a computer readable medium. Several embodiments are described below.

In one embodiment, a method for securing a computer device is provided. The method includes an operation for capturing interaction data for a user interfacing with the computer device, the interaction data including keyboard inputs and screen captures taken periodically. Further, the method includes operations for extracting semantic meaning of the interaction data, and generating a schema, based on the extracted semantic meaning, to create meaningful tags for the interaction data. The schema is analyzed based on a model in order to identify security threats, and an alarm is created when non-conforming behavior for the model is detected.

In another embodiment, a computer device includes a memory, a processor, and a keyboard for entering keyboard inputs. The memory includes a computer program that, when executed by the processor, performs a method, the method including an operation for extracting semantic meaning from interaction data that includes screen captures and the keyboard inputs. Further, the method includes operations for generating a schema based on the extracted semantic meaning to create meaningful tags for the interaction data, and for analyzing the schema based on a defined model to identify security threats. An alarm is created when a security threat is identified.

In yet another embodiment, a computer program embedded in a non-transitory computer-readable storage medium, when executed by one or more processors, for securing a computer device, is provided. The computer program includes program instructions for capturing interaction data for a user interfacing with the computer device, the interaction data including keyboard inputs and screen captures taken periodically. Further, the computer program includes program instructions for extracting semantic meaning of the interaction data, and program instructions for generating a schema based on the extracted semantic meaning to create meaningful tags for the interaction data. The computer program further includes program instructions for analyzing the schema based on a defined model to identify security threats, and program instructions for creating an alarm when non-conforming behavior for the model is detected.

In another embodiment, a security computing device includes a processor, memory, and a connector. The memory a computer program that, when executed by the processor, performs a method. The method includes operations for detecting that the connector is coupled to a second computing device, and for determining a user associated with the security computing device. In addition, the method includes operations for receiving periodic images from an image capture device coupled to the second computing device, and for performing continuous authentication operations to validate an identification of the user based on the periodic images. The user is disabled from using the second computing device after an authentication operation fails.

In yet another embodiment, a method for securing a computer device includes an operation for detecting that a connector in a security computing devices is coupled to a second computing device. In addition, the method includes operations for determining a user associated with the security computing device, and for receiving periodic images from an image capture device coupled to the second computing device. Further, the method includes an operation for performing continuous authentication operations to validate an identification of the user based on the periodic images. The user is disabled from using the second computing device after an authentication operation fails.

In another embodiment, a computer program embedded in a non-transitory computer-readable storage medium, when executed by one or more processors, for securing a computer device, includes program instructions for detecting that a connector in a security computing devices is coupled to a second computing device, and program instructions for determining a user associated with the security computing device. In addition, the computer program includes program instructions for receiving periodic images from an image capture device coupled to the second computing device, and program instructions for performing continuous authentication operations to validate an identification of the user based on the periodic images. The user is disabled from using the second computing device after an authentication operation fails.

In another embodiment, a method for securing network access includes operations for granting a user access to remote computer resources after authenticating a login request from the user sent from a secured computer device, and for receiving a network access request from a network access device for allowing the user to access the remote computer resources to the network access device. The method further includes an operation for sending a network access granted for the user to the network access device when the user currently has been granted access to the remote computer resources. The secured computer device performs periodic authentication operations to validate an identification of the user based on biometric data taken of the user. Further, the method includes operations for receiving notification from the secured computer device that one of the authentication operations has failed, and for sending a network access denied for the user to the network access device in response to the notification.

In yet another embodiment, a method for securing network access includes operations for granting a user access to remote computer resources after authenticating a login request from the user sent from a secured computer device, and for receiving a network access request from a network access device for allowing the user to access the remote computer resources to the network access device. In addition, the method includes another operation for sending a network access granted for the user to the network access device when the user currently has been granted access to the remote computer resources. The secured computer device performs periodic authentication operations to validate an identification of the user based on biometric data taken of the user, and the secured computer device notifies the network access device when one of the authentication operations has failed. Further, the network access device denies network access for the user in response to the notification.

In another embodiment, a computer program embedded in a non-transitory computer-readable storage medium, when executed by one or more processors, for securing network access, is provided. The computer program includes program instructions for granting a user access to remote computer resources after authenticating a login request from the user sent from a secured computer device, and program instructions for receiving a network access request from a network access device for allowing the user to access the remote computer resources to the network access device. Further, the computer program includes program instructions for sending a network access granted for the user to the network access device when the user currently has been granted access to the remote computer resources. The secured computer device performs periodic authentication operations to validate an identification of the user based on biometric data taken of the user. In addition, the computer program includes program instructions for receiving notification from the secured computer device that one of the authentication operations has failed, and program instructions for sending a network access denied for the user to the network access device in response to the notification.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIG. 7 illustrates a process for data collection, aggregation, and analytics, according to one embodiment.

FIGS. 8A-8C illustrate continuous authentication using a network access device, according to one embodiment.

FIG. 9 illustrates a privacy mode, according to one embodiment.

FIGS. 10A-10D illustrate interfaces provided by the continuous monitoring security system, according to one embodiment.

FIG. 14 illustrates an exemplary architecture of the security server, according to one embodiment.

DETAILED DESCRIPTION

The following embodiments describe devices, methods, systems and computer programs for securing a computer device. In one embodiment, an external security device is connected to a computing device in order to secure the computer device utilizing continuous authentication of a user.

It will be apparent, that the present embodiments may be practiced without some or all of these specific details. In other instances, well known process operations have not been described in detail in order not to unnecessarily obscure the present embodiments.

Figure 1:
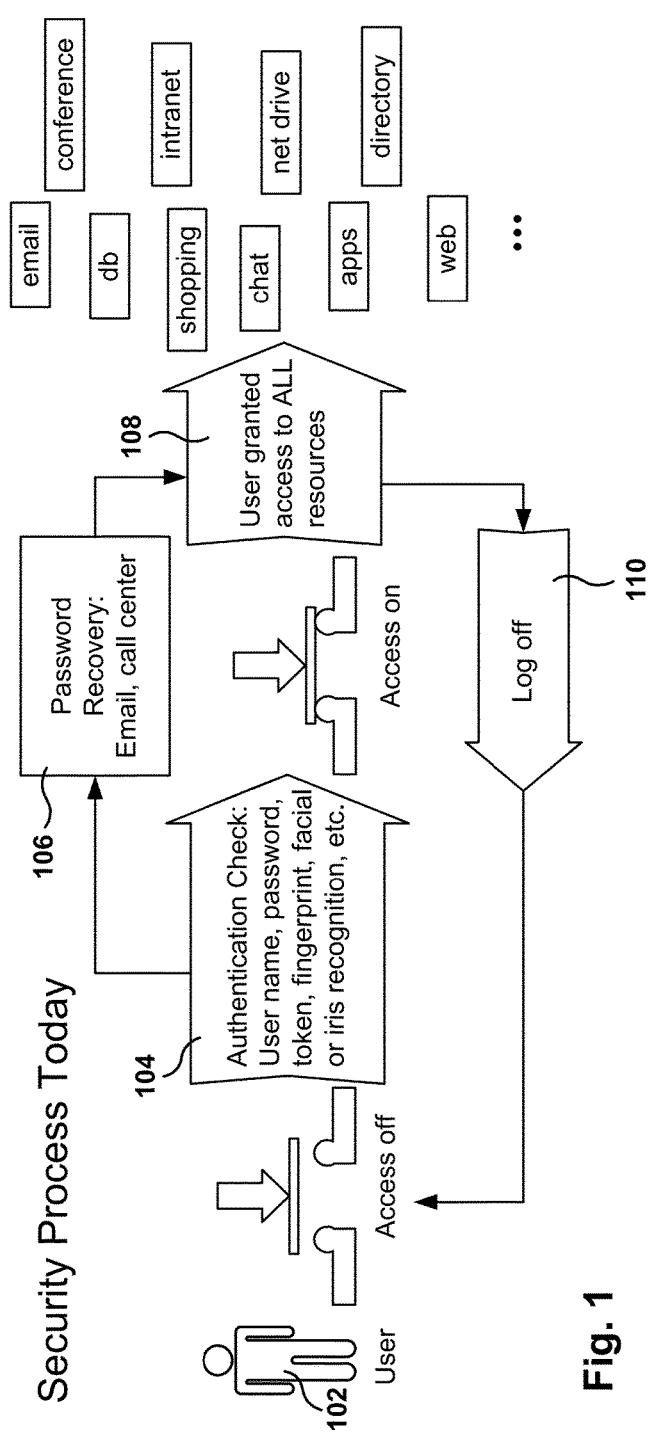
FIG. 1 illustrates the provision of computer access security, according to one embodiment.

FIG. 1 illustrates the provision of computer access security, according to one embodiment. In many of today's security solutions, a user goes through one authentication check 104, to obtain access 108 to all the computer resources that the user is authorized to access. The authentication check may be one or more of entering the username, password, use of a token, a biometric input such as fingerprint, facial recognition, or iris recognition, etc.

In one embodiment, if the user has a name or a login identifier but the user has forgotten or lost her password, a password recovery operation 106 is also possible, which may include emailing the user the password, providing support over the phone, or some other method for authenticating that the user is who the user claims to be. Once the user logs off 110, the access to computer resources is then revoked.

The problem with this approach is that once the user is authenticated, there are no more checks performed on the user. For example, if the user logs in a computer device and leaves the computer device unattended, another user may be able to gain access to the protected computer resources.

Figure 2:
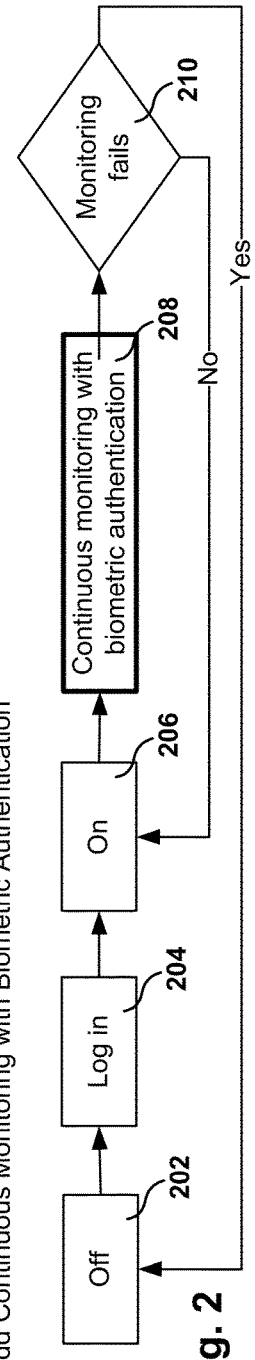
FIG. 2 illustrates a method for providing security that includes continuous user monitoring and authentication, according to one embodiment.

FIG. 2 illustrates a method for providing security that includes continuous user monitoring and authentication, according to one embodiment. In one embodiment, the solution to the single-authentication security weakness is to add continuous monitoring with biometric authentication.

This means that after the user logs in 204 and is granted access 206, a new operation 208 is added to the secure access process. In operation 208, a check is made periodically, or continuously, to verify that the user is still accessing the computer resources and that the user is the user that was granted access, and not somebody else.

If any of the continuous monitoring operations fails 210, then computer access is terminated 202, and the user must login (e.g., be authenticated again), before access is granted again. For example, if a user steps away from a computer terminal, a camera coupled to the computer terminal detects that the user is away from the computer terminal, and the security system disables the computer terminal until the user returns. Also, if another user is detected looking at the terminal, the secure access process may disable the computer terminal access, if the second user is not authorized to access the computer resources.

However, continuous monitoring with biometric authentication may be a challenging operation because some users are very mobile and utilize a plurality of different computer devices to gain access to computer resources through a plurality of networks. For example, a user may use a desktop, a laptop, a tablet, a smart phone, a TV, a cable box, etc. In addition, as the number of applications keeps growing, the places where the applications reside keep changing (e.g., from the company data center to the cloud).

Additionally, some users steal data because the users have a high degree of confidence that they will not be caught. For example, it is common for employees leaving the company to gather as much information as possible from that company so the users can use the information in the new company. However, if the user knows that her computer activities are being recorded (e.g., which files are being accessed, how much data the employee is accessing, a save operation of data to an external storage drive, etc.), the employees will be more reluctant to perform malicious operations.

Also, if data is stolen and an audit trail leads to an employee, the employee may say that her login or identification was stolen. However, the employee cannot use that excuse if images are being taken while the employee is performing the unauthorized operations.

The continuous monitoring with audit trail may also be used to record discoveries and how intellectual property is created within a company. For example, if the user has a good idea, the audit trail will show when the idea was conceived. If the user leaves the company and decides to use that idea for herself, the company has an audit trail that can be used to prove that the idea is the company's intellectual property.

In one embodiment, continuous monitoring requires biometric input in order to assure that the user is the user that has been granted access. Embodiments presented herein may use a variety of biometric signals, such as face recognition, fingerprint recognition, iris recognition, keyboard input trends, skin pattern recognition (e.g., using a bracelet), etc. In one embodiment, more than one biometric measure may be used to perform continuous authentication.

In another embodiment, the biometric signal may also be tied to a user input or to a user transaction. For example, each time a user opens a file, an image of the user is taken and added to the log that identifies when the file was opened. This serves as an audit trail for the user activities.

Figure 3:
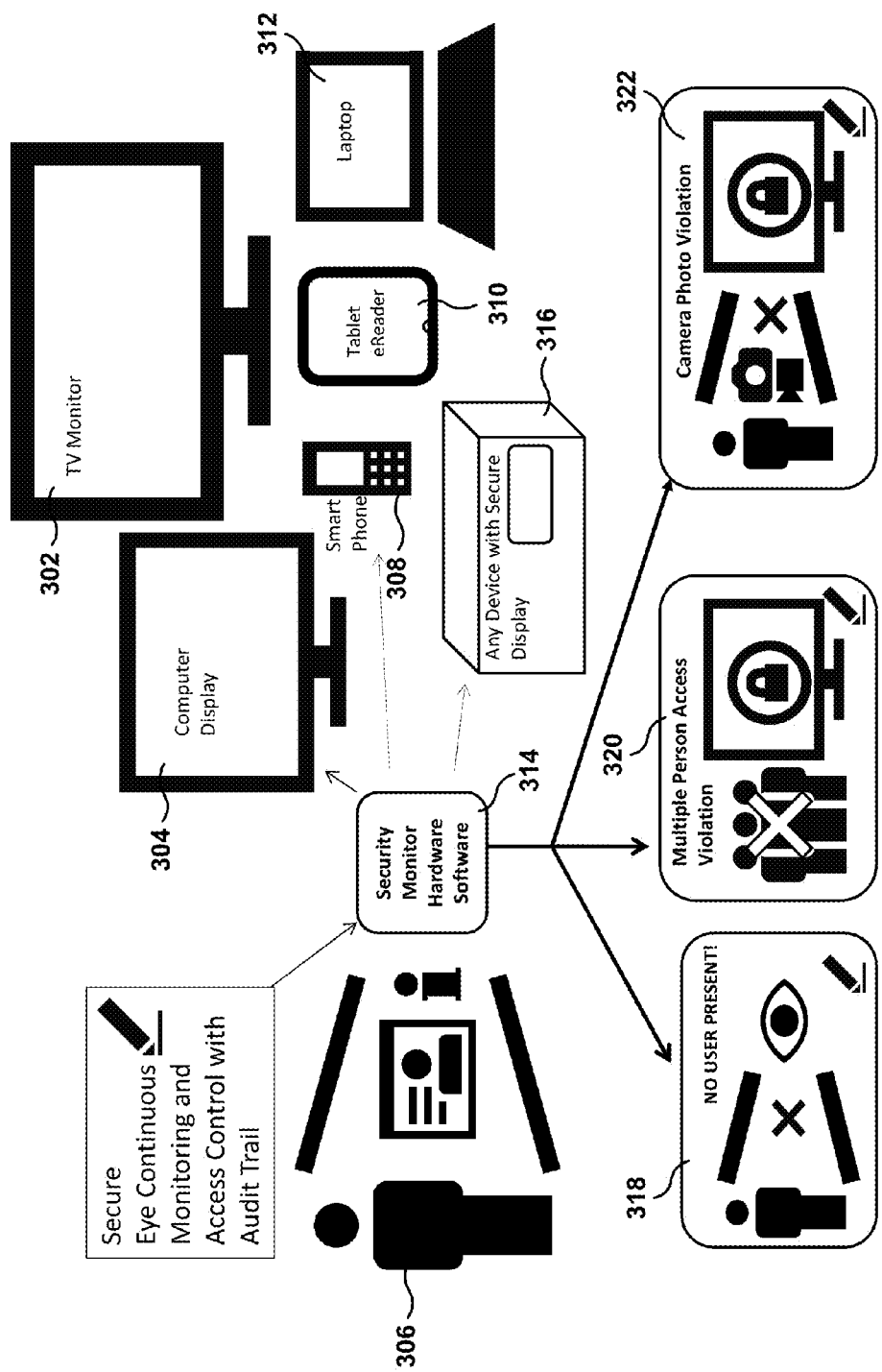
FIG. 3 illustrates a simplified architecture for implementing embodiments described herein.

FIG. 3 illustrates a simplified architecture for implementing embodiments described herein. One embodiment is similar to a "black box flight data recorder" in an airplane. The authentication system has the ability to identify the display component and the computer monitor as a trusted device. The trust is then integrated with the user who is in front of the display device, by physically identifying and authenticating the user. Various biometric sensors may be utilized for the user physical authentication, such as cameras for face recognition, IRIS recognition, fingerprint, temperature sensor, weight sensor, Electroencephalography (EEG) signal via Brain computer Interface and DNA, etc. In one embodiment, sensor data is continuously transmitted and validated through a Side Channel Interface (SCI) that communicates with a centrally located authentication registry. In another embodiment, the sensor data is transmitted in predefined intervals or periods of time.

In one embodiment, the biometric identity of the user is tied with the centrally available authentication system that uses a username and password, or any other additional data, such as physical location information, time and date, etc. The authentication utilizes multiple pieces of information to establish a physical presence of the user, which is integrated with the trusted display and computer. The trusted (e.g., secured) display device is both first and last point of interface to the user and any protected information and services are protected and available for use by an authorized user.

In one embodiment, the user is continuously authenticated throughout the session, based on physical presence and using data signals from multiple sensors integrated with the display such as cameras, microphones, speakers, IR detectors, thermometers, proximity sensors. In one embodiment, additional inputs from other external sensors are utilized, such as pressure sensors, weight sensors, surveillance cameras in close proximity to the secured monitor in front of the user, IP addresses, MAC addresses, physical location data, etc., to improve system accuracy.

Figure 4A:
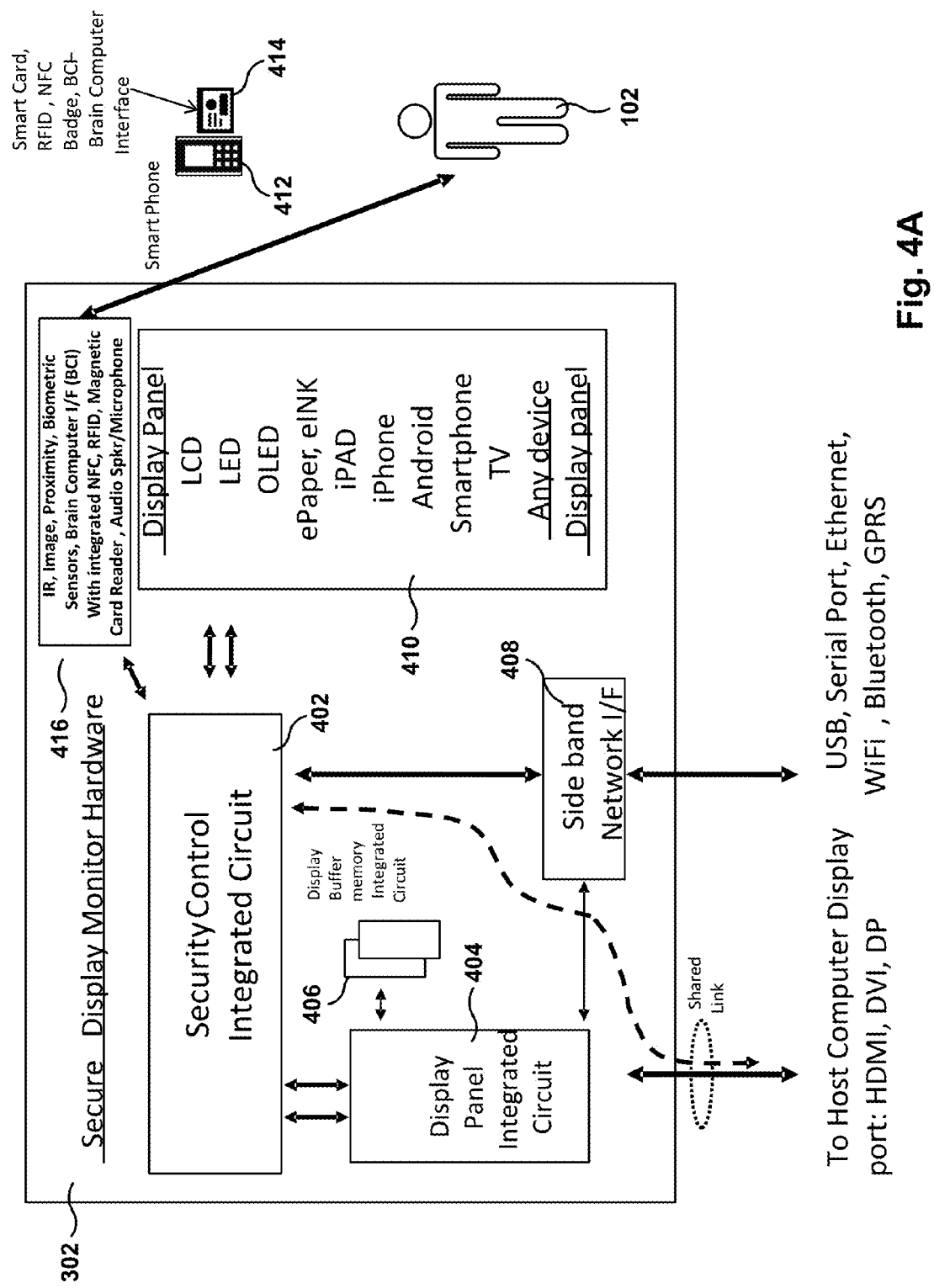
FIGS. 4A-4B illustrate an exemplary security architecture that includes a security control external device, according to one embodiment.

FIG. 4A illustrates an exemplary security architecture to implement embodiments presented herein, according to one embodiment. Embodiments of the disclosure address the human factor involved in IPR management issues to provide a continuous authentication and monitoring system. Embodiments eliminate the "opportunity", nullify "rationalization" and create a negative ROI for "Incentive/Pressure" to encourage and build a "habit" of good citizen behavior.

Besides IPR protection management, the secure embodiments presented herein may be used for applications in work flow tracking and optimization, manufacturing, testing, quality assurance, payment systems, and DRM applications. Embodiments prevent the copying or misuse of information displayed on any monitor by employing continuous context-based smart activity processing technology. In one embodiment, every user in the range of visibility of the monitor is continuously monitored and authenticated.

In an exemplary embodiment, the secure display monitor 302 includes a security control integrated circuit (IC) 402 that interfaces with other modules within the display 302. The display further includes a display panel (e.g., an LCD) IC 404 that drives the display panel 410, a display buffer memory 406 for storing pixel data to be displayed on the LCD 404, a side band network interface 408, and one or more sensors 416.

The security control integrated circuit 402 shares a link to the host computer with the display panel IC. This link provides the data to be displayed on the monitor and may utilize one or more different protocols such as HDMI, DVI, DP, etc. In addition, the security control IC 402 utilizes the side band network interface 408 to communicate with a remote security server without having to rely on networking resources from the host. The side band network interface 408 may utilize one or more communications protocols selected from a group consisting of USB, serial port, Ethernet, WiFi, Bluetooth, GPRS, any mobile communications protocol, etc.

The sensors 416 integrated in the display may include one or more of an infrared sensor, image sensor, proximity sensor, biometric sensor (e.g., fingerprint, eye recognition, etc.), Brain Computer Interface (BCI) with integrated NFC, RFID, magnetic card reader, microphone, speaker, etc. In one embodiment, the sensors 416 monitor communications near the monitor such as communications utilizing a mobile phone 412, or a smart card 414 being utilized by the user 302.

It is noted that the embodiments illustrated in FIG. 4A are exemplary. Other embodiments may utilize different sensors, additional modules, or combine the functionality of two or more modules into a single module. The embodiments illustrated in FIG. 4A should therefore not be interpreted to be exclusive or limiting, but rather exemplary or illustrative.

Figure 4B:
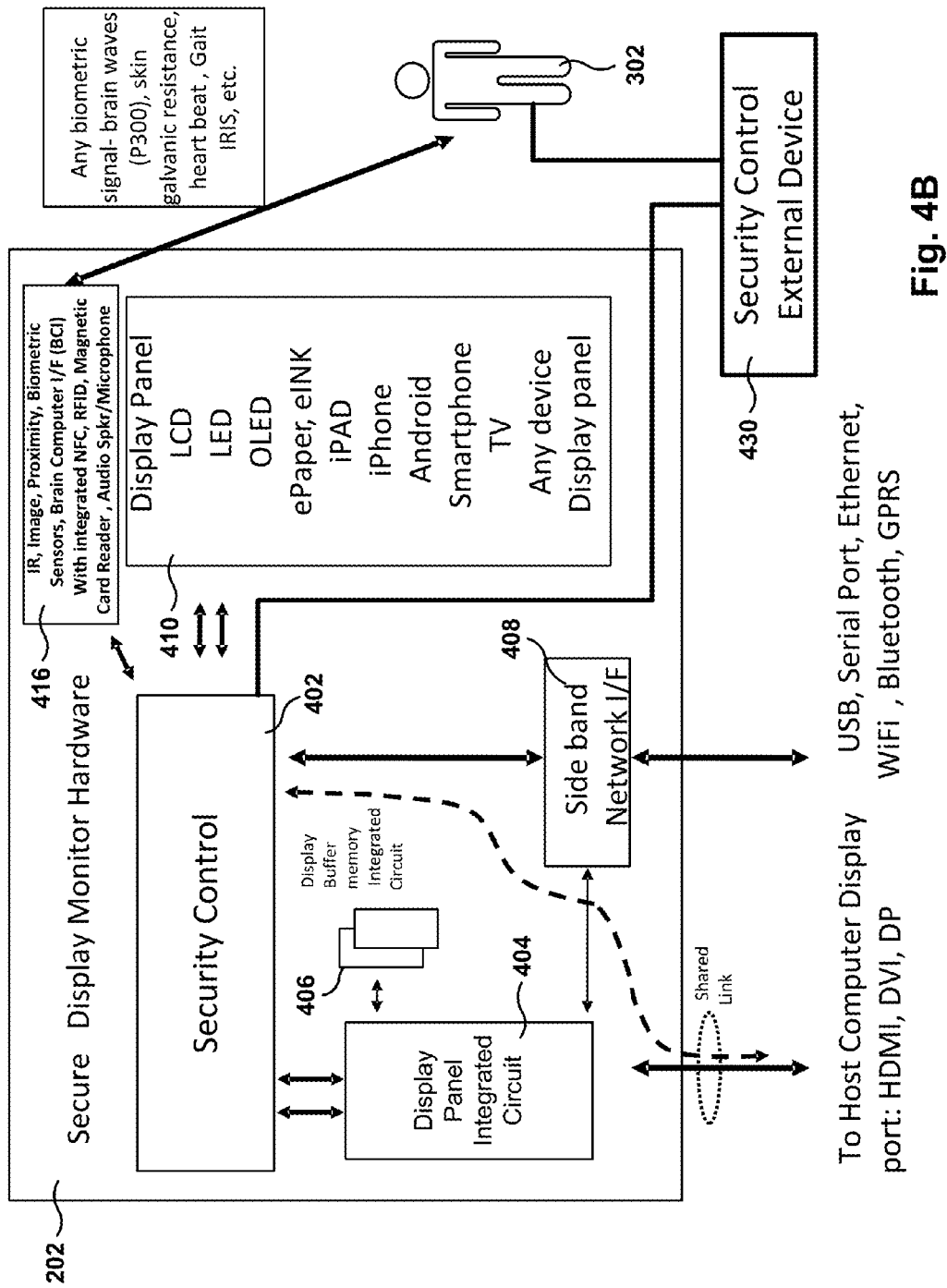

FIG. 4B illustrates an exemplary security architecture that includes a security control external device, according to one embodiment. In one embodiment, a Security Control External Device (SCED) 430 is provided for performing security operations. The SCED 430 connects to a security device in order to enforce security procedures for accessing computer resources. The SCED 430 may be coupled to any computing device, such as a personal computer, a display, a laptop, a terminal, a mobile phone, a tablet, etc. In one embodiment, the SCED is a small device that may be carried by the user and then connected to a computer when secured computer access is required.

In one embodiment, the SCED is coupled to the computing device via a wired connection, such as USB, a serial link, a parallel connection, a phone interface, an HDMI port, a video port, an audio port, etc. In another embodiment, the SCED is coupled to the computing device via a wireless connection, such as Bluetooth, RFID, 802.11 WiFi, NFC, etc. In another embodiment, the SCED may be coupled either via a wired or a wireless connection.

In yet another embodiment, the SCED may be virtualized and be executed remotely on a network. For example, the SCED may be implemented by a virtual machine running on hypervisor.

In one embodiment, where facial recognition is being utilized to monitor the user, the SCED interfaces with a camera in the computer device to take images of the user in order to provide the continuous monitoring required. In another embodiment, the SCED includes a camera that may be used to provide facial recognition. For example, the SCED may be coupled to a USB connector on a display in order to take images of the user interfacing with the display. In this embodiment, the SCED includes logic to ensure that the USB port being used is the USB port provided in the display, in order to avoid tampering with the system where a malicious user could connect the SCED to another USB port in order to fake an identity of the user interfacing with the display.

Is also noted that the SCED may not only interface with the camera and the computer device, but also with any other type of biometric input device, such as skin recognition, iris recognition, galvanic resistant, heartbeat monitoring, gait monitoring, etc.

It is noted that the embodiments illustrated in FIGS. 4A-4B are exemplary. Other embodiments may utilize different components, or omit some components, combine the functionality of several components, etc. The embodiments illustrated in FIGS. 4A-4B should therefore not be interpreted to be exclusive or limiting, but rather exemplary or illustrative.

Figure 5:
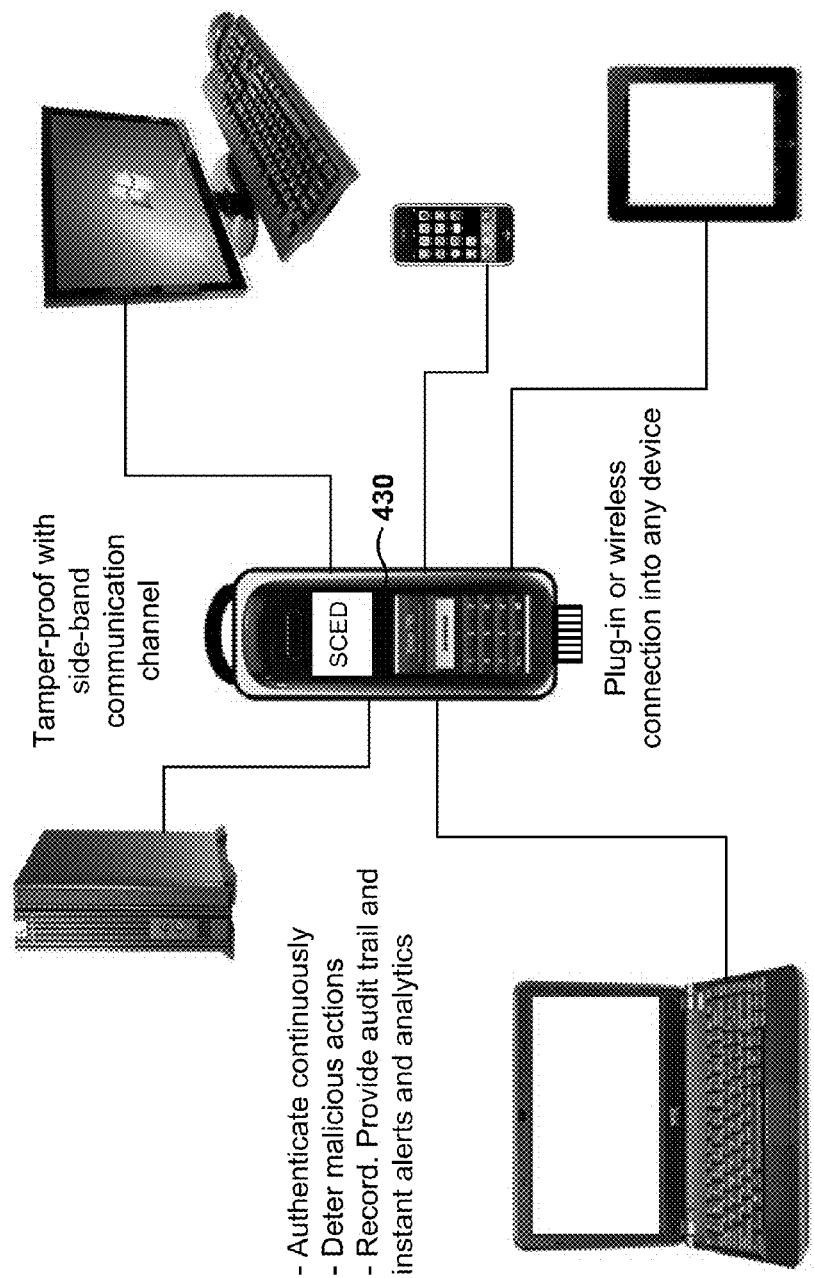
FIG. 5 illustrates the operation of the security control external device, according to one embodiment.

FIG. 5 illustrates the operation of the security control external device, according to one embodiment. The SCED 430 is a portable device that provides continuous authentication. In one embodiment, the SCED measures and tracks all the activities of the user while accessing secure computer devices. In one embodiment, the SCED includes permanent storage and stores all or some of the security data on the SCED. In addition, the SCED may also transfer the security data to a remote secure service for storage.

The SCED providing continuous authentication is a deterrence to malicious activities, and the security information captured provides an audit trail for future reference, in addition to the generation of instant alerts and the performance of analytics on the data captured.

In one embodiment, the SCED provides a side-band communications channel to the secure server. The SCED measures and tracks digital and physical activities (e.g., presence, motions, etc.) and establishes a link between the digital and physical activities of the user. In another embodiment, the SCED shares the same network communication path as the computer device.

In one embodiment, the SCED is used to separate personal and "company" activities. When the user utilizes a computer device without the SCED, the user may perform private activities, without any risk of being monitoring. Also, while the user is operating without the SCED, the secured company resources are unavailable to the user.

In one embodiment, the SCED has its own power supply, which allows the SCED to communicate wirelessly with the computer device, without having to connect the SCED to the computer device. However, this may cause a problem with battery life for the SCED, and the user will have to make sure that the SCED is always charged to be ready for operation. When the SCED is coupled to the USB, the SCED may get power through the USB connection, and the battery-life problem is eliminated.

In one embodiment, the SCED includes a display, which may be a touchscreen or a regular display without touch sensitivity. In another embodiment, the SCED does not include a display.

The touchscreen allows the user to enter inputs into the SCED. For example, the user may be able to enter a password to unlock the SCED, or to be sent to a remote location for authentication. In this case, a keyboard may be presented in the touchscreen to allow the user to enter alphanumeric inputs.

The touchscreen may also be used to enter a secure mode utilized by administrators to set up and configure the SCED. In one embodiment, the display is also used to provide information to the user regarding use. For example, the SCED may provide information regarding the amount of time where the user has had secured authenticated access, amount of time the user has been in private access mode, statistics about the amount of time worked by the user, etc.

It is noted that the embodiments illustrated in FIG. 5 are exemplary. Other embodiments may utilize different devices, configurations, connections, etc. The embodiments illustrated in FIG. 5 should therefore not be interpreted to be exclusive or limiting, but rather exemplary or illustrative.

Figure 6A:
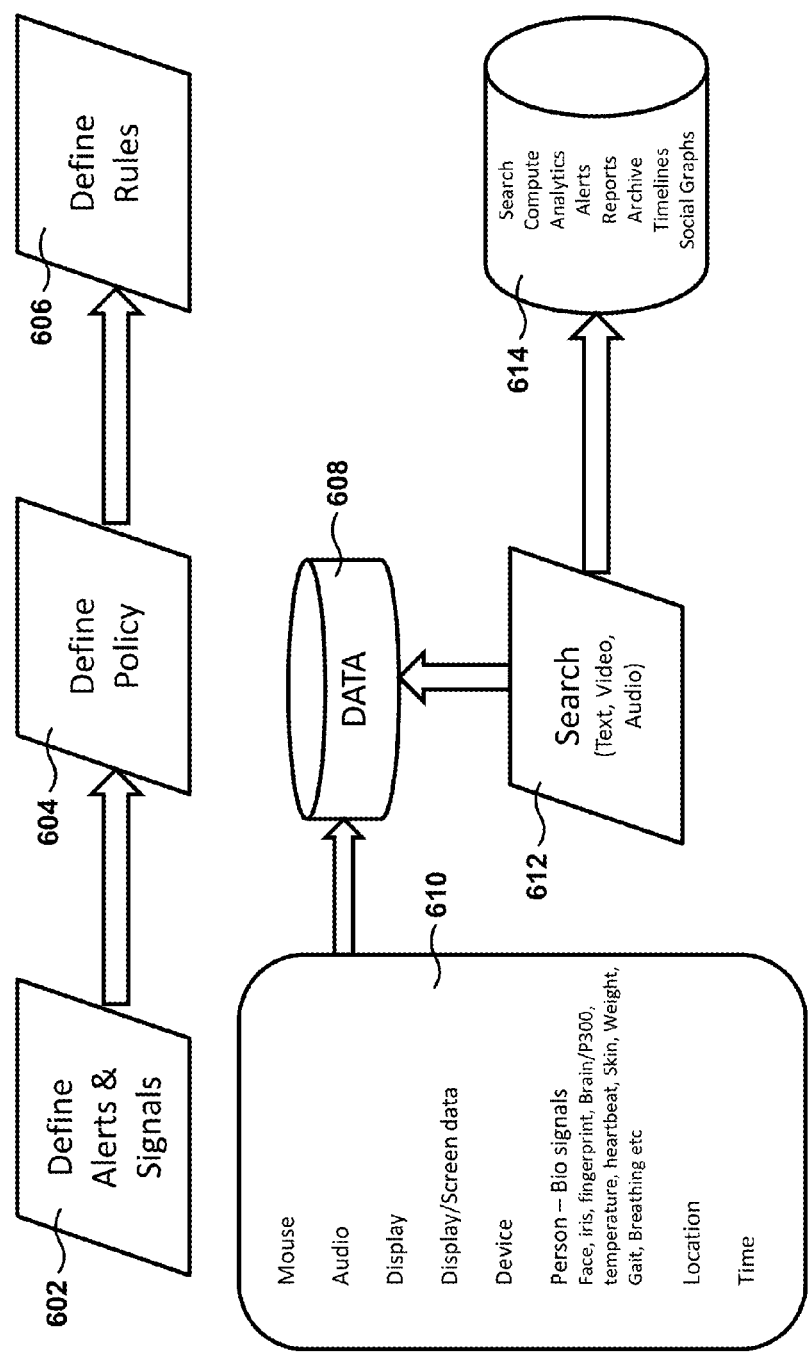
FIGS. 6A-6B illustrate an architecture for continuous security monitoring and detection of model violations, according to one embodiment.
Figure 6B:
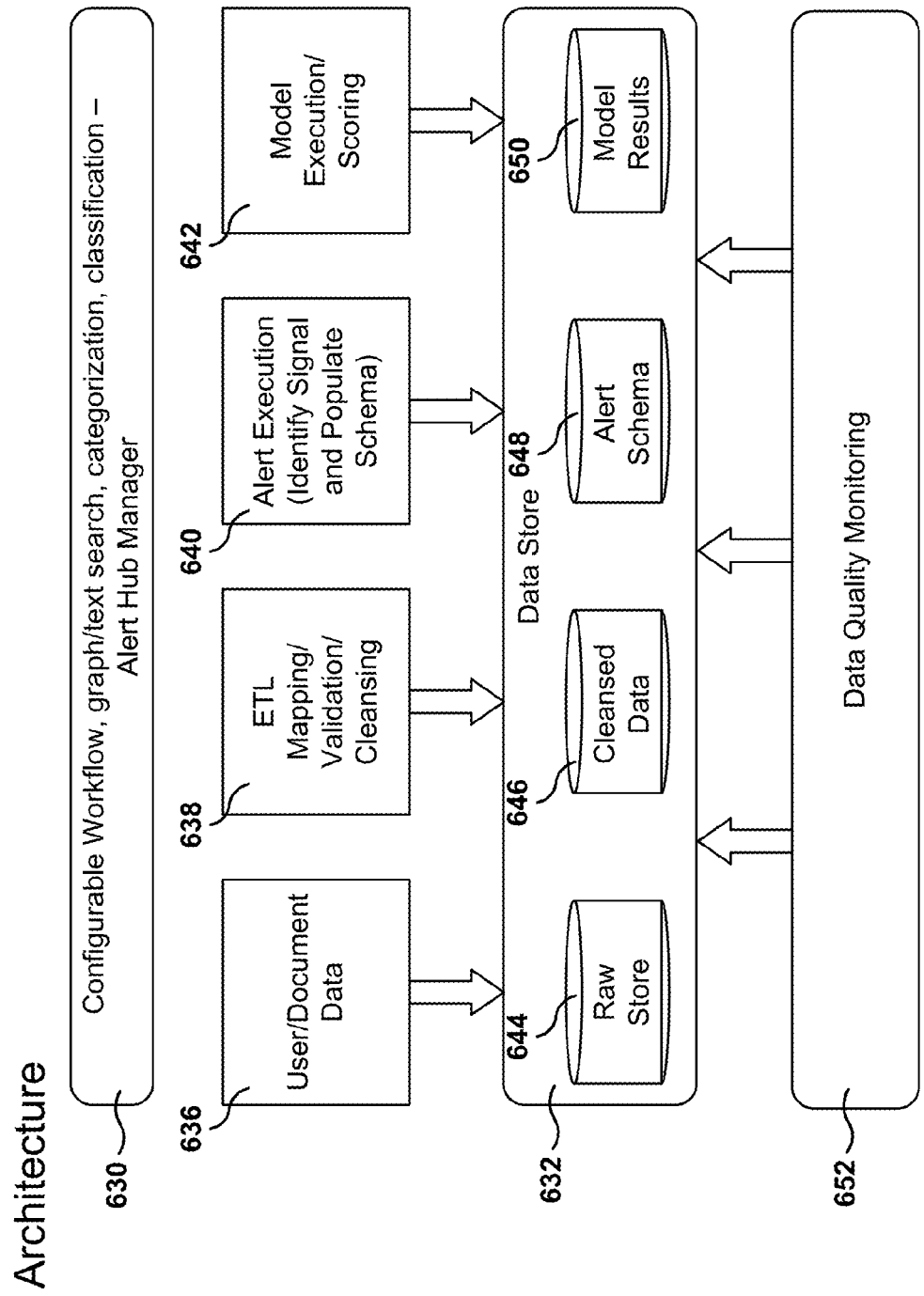

FIGS. 6A-6B illustrate an architecture for continuous security monitoring and detection of model violations, according to one embodiment. FIG. 6A identifies at a high level the security process. In operation 602, the administrator defines alerts and signals that will be captured in order to implement security.

In one embodiment, a signal is defined as any event that denotes an activity that generates new data or an indication of some user activity. As used herein, a signal may also be referred to as an event. For example, a signal may be generated when a user copies data to a storage device connected to a USB port.

From the defined alerts and signals, a security policy is 604 defined that includes the parameters for implementing security processes, such as authentication methods, frequency of authentication, activities allowed for each user, access modes allowed for each user, etc.

After the security policy is defined, rules 606 are created to implement the security policy. The rules may be implemented at the secure server and also at the remote computing device. For example, a rule for a user may identify that images of the user are to be taken every five seconds together with screen captures of the display.

The data 610 may be captured for any digital or physical activity of the user, such as, mouse inputs, audio inputs, display updates, screen captures, external device being utilized (e.g., plugging in a thumb drive), biometric signals of the user (face, iris, fingerprints, heartbeat, temperature, weight, briefing patterns, etc.), location of the user (e.g., GPS data), timestamps, etc.

The data is stored in a database 608, which is searchable 612 by the security administrator. In one embodiment, a limited search capability is also provided to the user. For example, the user may have lost some data and is able to go back in time and find the data in the secured database.

In addition, the data may also be used to perform analytics 614 to detect certain security conditions that may produce alerts. Analytics may be performed on-the-fly in real time, or may be performed on historical data. For example, after a security breach is detected the administrator may go back and perform searches around the time related to the security breach.

FIG. 6B illustrates an exemplary architecture of the security system, according to one embodiment. Alert hub manager 630 provides interfaces to create and refine the security policy and the security alerts. For example, the alert manager may include a configurable workflow, graph searching, text searching, categorization of data, classification of data, etc.

The data store 632 includes several types of data, such as raw data related to computer use (e.g., images, inputs, screen captures, etc.), "cleansed" data (e.g., data that results from filtering the raw data according to some criteria), alert schema (e.g., events defined in the security policy that create alerts for administrator), and model results after applying the model to the data. The alert schema may identify potential security threats, such as a user accessing confidential documents that include words like "proprietary" or "confidential."

The user data 636 (e.g., data created or accessed by the user) is saved in the raw store 644. The raw data is analyzed, via Extract/Transform/Load (ETL) process, to normalize the data sets and save the normalized data as cleansed data 646. Normalization means applying rules to the data to save the data in a standard format. The ETL process, in one embodiment, extracts information from the raw data, such as by doing an optical character recognition (OCR) on a screen capture. In addition, the data maybe tagged by adding tags that relate to the content of the data. For example, a piece of data may be tagged as "open file" when a user performs any operation on the computer device that requires opening a new data file. In one embodiment, time stamps are included with the tagged data.

After the data has been normalized (e.g., "cleansed"), an alert execution and detection module 640 creates an alert schema 648 by applying the security rules defined in the security policy to the cleansed data. For example, the alert schema may detect that the user accessed secure data after work hours, which may or may not generate an alert, depending on the function of the user and the type of data access.

After the alert schemas have been created, the security model is applied to the data and the schema to generate model results 650. In one embodiment, the model results 650 identify user behavior that deviates from the norm, which is identified by applying the security rules and the refining of the security rules over time. For example, the model execution and scoring module 642 may detect that a user has accessed in one week 50 times the amount of data that the user regularly accesses over a test period (e.g., one year). This may be an indication that the user is ready to leave the company and steal as much company data as possible.

Many signals may be extracted from the data, and the model execution allows the system to identify security-critical events among all the data collected. In one embodiment, a self-learning machine algorithm is used to refine the security model and security policies. For example, after observing the activities of a user for six months, the model identifies what are "normal" user operational parameters, such as work hours, number of files accessed per day, directories accessed, number of pages printed per week, etc. By identifying the normal routine of the user, the model engine is able to detect when user activities fall outside the model, which may generate an additional scrutiny of the user activity.

In one embodiment, the data in the data store 632 may be utilized to notarized user and company activities. For example, the company may be able to prove when a user has purchased some equipment, or when a user sent a date-critical email to another company, etc. By providing detail information which includes images of the user, timestamp, screen captures etc., the company is able to prove the activities performed by the user, if needed.

FIG. 7 illustrates a process for data collection, aggregation, and analytics, according to one embodiment. FIG. 7 shows the flow of information while applying the security model. The user interaction data 702 is provided to the database 710 storing the data, and is also used by the ETL engine 704. As discussed above, the ETL engine 704 performs data aggregation, consolidation, and relationship definition (e.g. graphs), on the data.

In operation 706, a semantic extraction (e.g., meaning extraction) is performed by analyzing user actions, inputs, words, events, operations (e.g., saved to a USB drive, cut and paste data, email and file,), etc.

In operation 708, the schema generation produces tags, identifies security-critical data, etc., as well as generating alerts based on the security model. A graph, search, analytics, and report generation engine produces security data for the administrator. For example, the security system may identify user patterns and behaviors as well as the times when the behaviors fall outside the security model. In this case, an alert is generated for the administrator identifying the unusual or unsafe behavior.

In one embodiment, graphs and charts may also be produced. For example, a histogram might be generated of the user activity, which shows peaks in activity that fall outside the model. The security engine, further identifies where the user has fallen outside the model, including associated data like images of the user, screen captures, data access, amount of data access, etc.

In one embodiment, the information may be compiled into a report presented to the administrator, but other forms of notification are also possible. For example, the system may send an email, a text message, a voice message, an image, a page, open a window on the administrator's console, etc.

In one embodiment, the user may be also notified that the user has triggered a security alert, such as when the user is accessing a confidential file. Once the user is notified, the user may contact the administrator to explain the identified security alert.

The creation of the rules and the security policy also allows for the generation of exceptions for one or more users. For example, users that compile monthly data may be created an exception that refers to a large amount of data access at the beginning or at the end of a given month. Another exception may be related to a user changing jobs, which would mean the user accessing different types of files and an increase of activity with respect to the norm defined by the model due to the new job.

It is noted that the embodiments illustrated in FIG. 7 are exemplary. Other embodiments may utilize different elements, different operation, different ways to search or analyze the data, etc. The embodiments illustrated in FIG. 7 should therefore not be interpreted to be exclusive or limiting, but rather exemplary or illustrative.

Figure 8B:
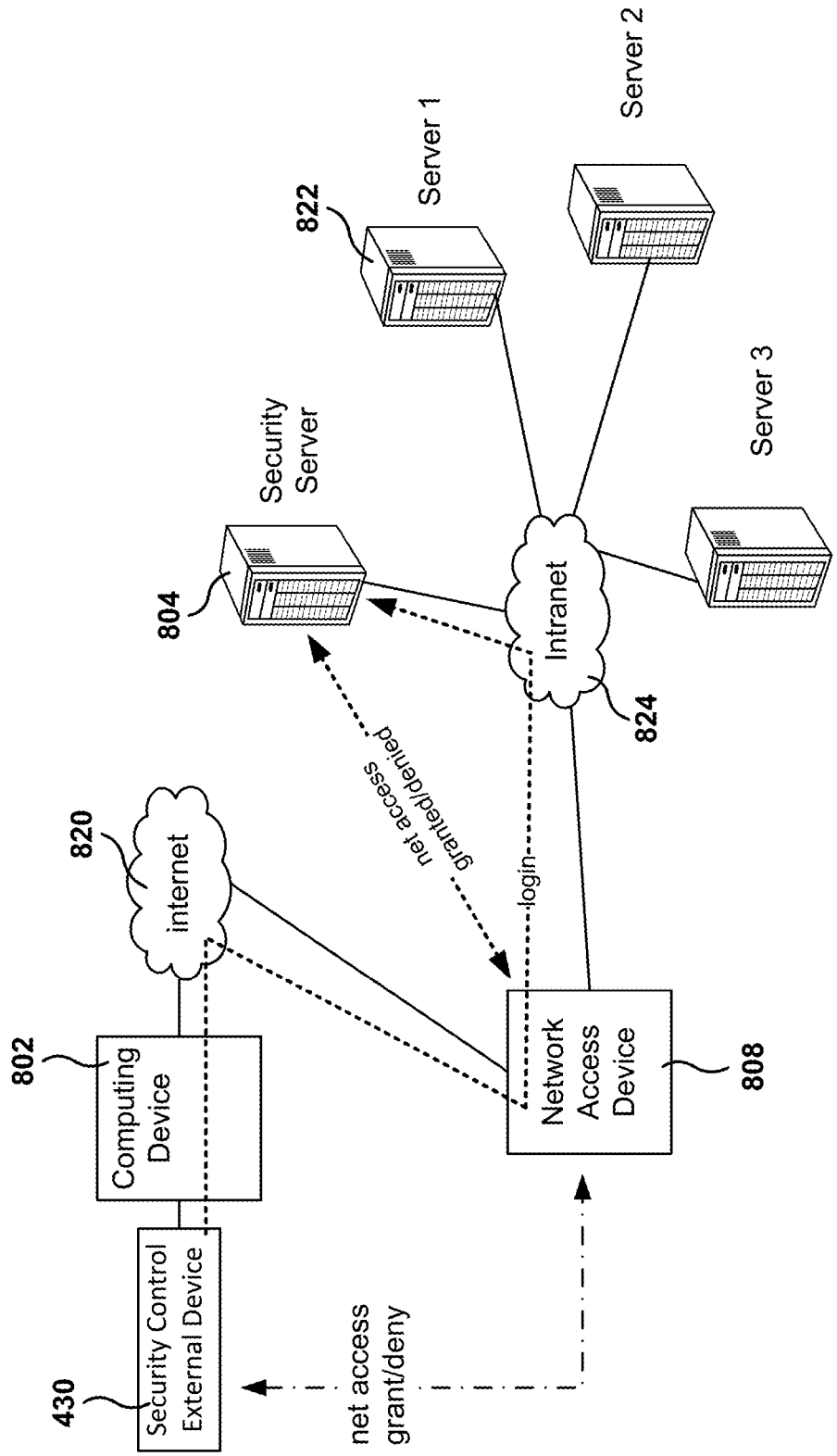
Figure 8C:
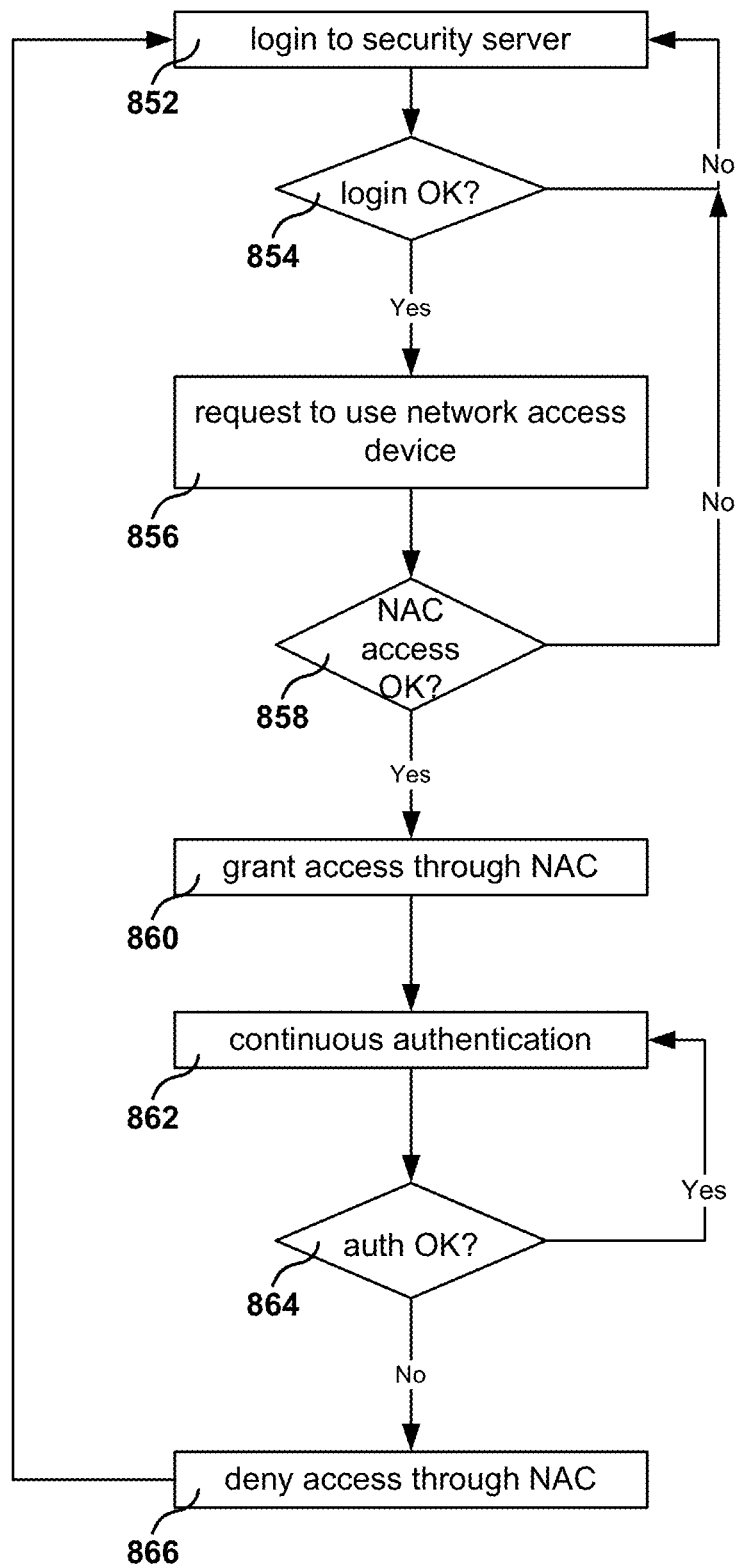

FIGS. 8A-8C illustrate continuous authentication using a network access device, according to one embodiment. In one embodiment, the computer device access secure resources via a network access device 808. The network access device 808 provides an added level of control for user access, because the network access device allows the system to cut off access by disabling the user from utilizing the network access device 808.

In one embodiment, the user access to secure resources is performed in 2 operations. In the first operation, the user logs in (e.g. gets authenticated) for using the secured resources. In one embodiment, the user access security system 804 that provides the required authentication using the computing device 802 and the attached SCED 430, as previously described.

After the user gains authentication, the user then logs in to get permission to access a network access device 808. The network access device acts as a gateway to access secure resources. If at any time there is a security violation, the network access device is able to cut off access to the secured resources. For example, if the continuous monitoring and authentication fails at a point in time, the enterprise server 806 may command the network access device 808 to cut off access for the user.

As used herein, "continuous monitoring" refers to the testing and checking the authentication of the user repeatedly. For example, continuous monitoring may refer to taking periodic samples (e.g. every half a second) of the image of the user, or may refer to actually taking continuous measurements such as the heart rate of the user. Sometimes, the frequency of sampling of data may vary, but it is still considered continuous monitoring unless otherwise noted. Further, as used herein the computer device has "binding" with the remote secured resources as long as the computer device, and the user using it, are authenticated by the secure system. Once the user loses the authentication, the binding is said to have been broken.

FIG. 8B illustrates an architecture for accessing secure resources with the network access device 808, according to one embodiment. A user wishing to get access via computing device 802 to servers 822 in a company's intranet 824, connects the SCED 430 to the computing device 802 and then performs an authentication/login to security server 804. The user is connected to the network access device 808 through the Internet 820 or through some other network. For example, the user may access the network access device 808 via a telephone data network.

In one embodiment, if the authentication is successful, the security server 804 sends a message to the network access device 808 to allow access to the user through the network access device 808.

In another embodiment, after the user is authenticated by the security server 804, the computing device 802 logs in to the network access device 808. The network access device then exchanges communications with security server 804 to validate the access by the user. If the security server 804 grants access, then a message is sent to the network access device to notify the network access device that the user is authorized. In another embodiment, the network access device interacts with the security control external device 430.

As previously discussed, the security system, including the SCED 430, provides continuous authentication and monitoring of the user activity. If authentication fails at any point in time (e.g., user walks away from the terminal) then the network access device 808 is notified by the security server 804, or by the SCED 430, that access is not allowed anymore. In this case, the network access device will shut off all access to the intranet 824 from computing device 802. At this point, the user may still access personal data or the Internet in a "public" mode. A "private or secure" mode is when the user has been authenticated and binded, and monitoring is active. The user may toggle between modes as well.

If the user is later re-authenticated, the network access device may be reactivated to allow user access. In one embodiment, after the initial access is granted by the security server 804, the SCED 430 exchanges messages with network access device 808 based on the status of the authentication of the user. This means, that during normal operation, the SCED 430 is able to control the network access device to turn on or off access, without having to provide continuous login to security server 804.

FIG. 8C is a flowchart of a method for providing secure access to a network access device, according to one embodiment. While the various operations in this flowchart are presented and described sequentially, one of ordinary skill will appreciate that some or all of the operations may be executed in a different order, be combined or omitted, or be executed in parallel.

In operation 852, a user logs into a secure server. From operation 852, the method flows to operation 854 where a check is made to determine if the login operation 852 was successful.

If the log in operation 852 is not successful, the method flows back to operation 852; and to operation 856 if the log in was successful. In operation 856, a request for access through the network access device is sent. In one embodiment, the request is sent to a security server, and in another embodiment the request is sent directly to the network access device.

From operation 856, the method flows to operation 858 where a check is made to determine if access through the network access device was granted. If the access was granted, the method flows to operation 860; and to operation 852 otherwise.

In operation 860, access is granted to the user through the network access device. From operation 860, the method flows to operation 862 were continuous authentication and monitoring of user activities is performed. In operation 864, a check is made to determine if the authentication fails at any point in time. If the user continues being authenticated, the method flows back to operation 862, but if the authentication fails at any time, the method flows to operation 866.

In operation 866, the access to the network access device is denied due to the failure of the authentication, and from operation 866 the method flows back to operation 852. In other embodiments (not shown), after the authentication fails, the method uses another loop to perform continuous authentication while access is disabled, and if the authentication is reestablished, the method goes back to operation 860 to obtain access to the network access device.

FIG. 9 illustrates a privacy mode, according to one embodiment. In one embodiment, the user is provided a privacy mode, also referred to as personal mode, where the user is not being monitored by the security system. In one embodiment, the user is denied access to secure resources while in privacy mode, but the user is able to access personal data and applications, such as reading email, accessing a social network, using an Internet browser, reading the news, etc.

In one embodiment, the user is not authenticated while in privacy mode, and in another embodiment, the user is still authenticated while in privacy mode. Although the user is able to access personal information, the computing device still authenticates that the user is the person authorized to use the computer device. For example, in privacy mode the user may be able to access personal email at the office, but if another user tries to use the computer of the authorized user, the security system will lock access to the unauthorized user.

During privacy mode, user activities are not recorded. In one embodiment, an indicator is provided 902 to let the user know when the user is in private or secure mode. In one embodiment, the indicator is a light source around the display. In another embodiment, the indicator is presented on the display (e.g., a box with a message saying "private mode"). In one embodiment, as the user toggles back and forth between secure and private modes, the system security logs will show how much time is spent in each mode.

FIGS. 10A-10D illustrate interfaces provided by the continuous monitoring security system, according to one embodiment. FIG. 10 A illustrates some of the interfaces provided by the security system. Embodiments presented provide a solution to a complex problem, a graph search engine for digital activity.

Continuous monitoring, in one embodiment, takes snapshots of the user together with the screen captures 152 periodically. For example, every 5 seconds although other intervals are also possible. In addition, the monitoring may change after detecting a special event (e.g., recording keyboard inputs five seconds before, and one minute after, the user presses control-C). In addition, the frequency of screen captures and monitoring may also be added in response to special events.

The security console further provides an interface 154 for performing search operations. More details for the search interface are provided below with reference to FIG. 10B. In another embodiment, a window 156 displays the image provided by the security camera. In addition, a social graph of the user might be created, as described in more detail below with reference to FIG. 10C.

FIG. 10B illustrates the versatility of the search interface, according to one embodiment. As discussed above, the continuous authentication and monitoring system is able to collect a large amount of data related to the user's presence, the user inputs, access to applications, etc., together with timestamps and correlation of the different events and data recorded by the system.

Given that versatility provided for recording data, the search interface is also versatile, being able to select one or more factors for the search. The search criteria may include user ID, type of event, data tags, time period, access device, user location, alarm generated, etc. In addition any of this type of criteria may be combined utilizing Boolean logic. For example, the search administrator may search activities of two users when both users were connected to the security system, and compare the activities performed by the two users in order to determine, for example, if the users were cooperating in some malicious activity.

Further, the security system enables the administrator to add new criteria for the search. For example, the administrator may add to the monitoring system that the every time the word "confidential" is presented on the display, a tag named "confidential" is recorded. A new criterion may be created regarding the use of time "confidential." This way, the administrator may later search for the tag confidential easily.

Figure 10A:
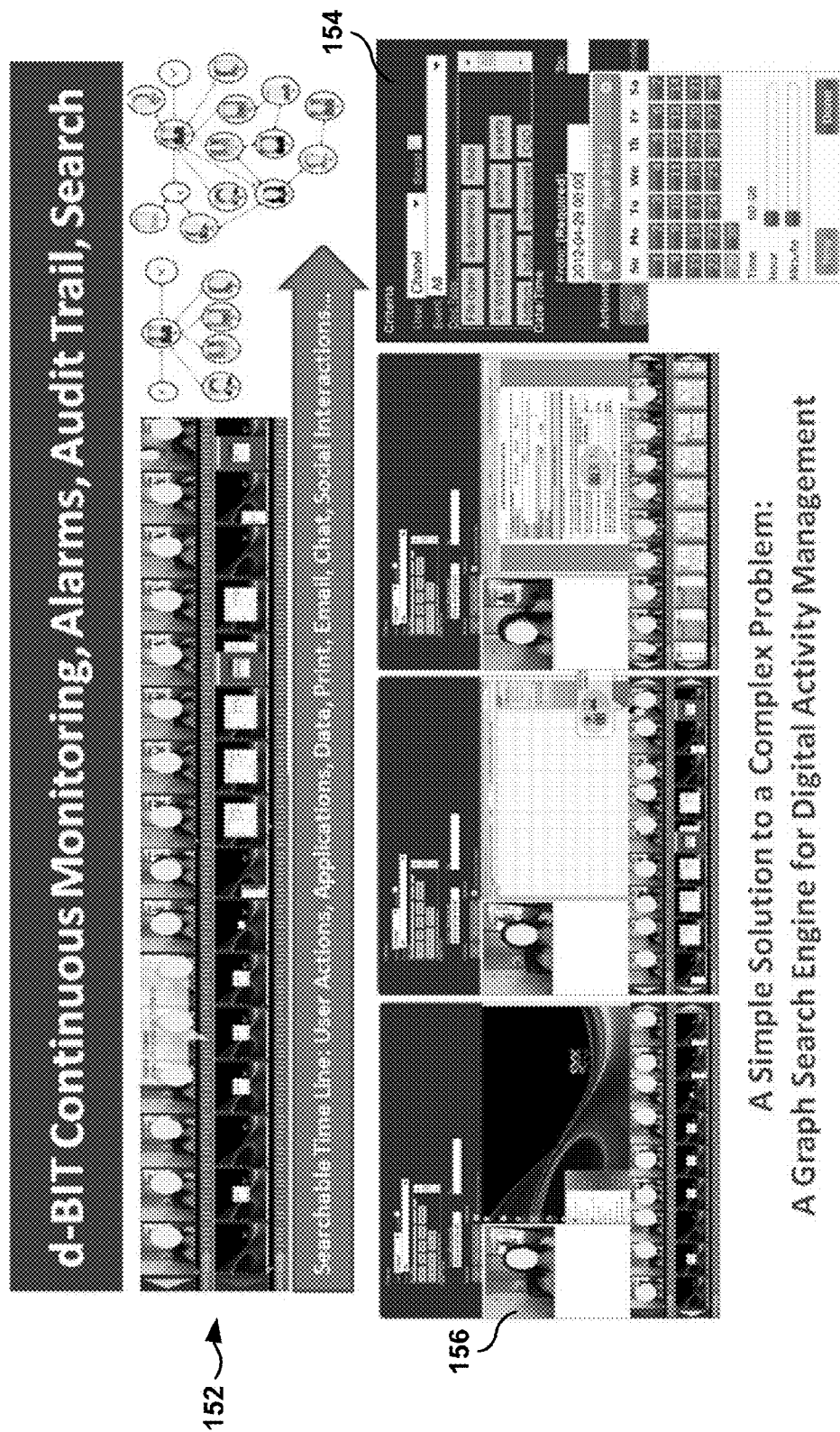
Figure 10C:
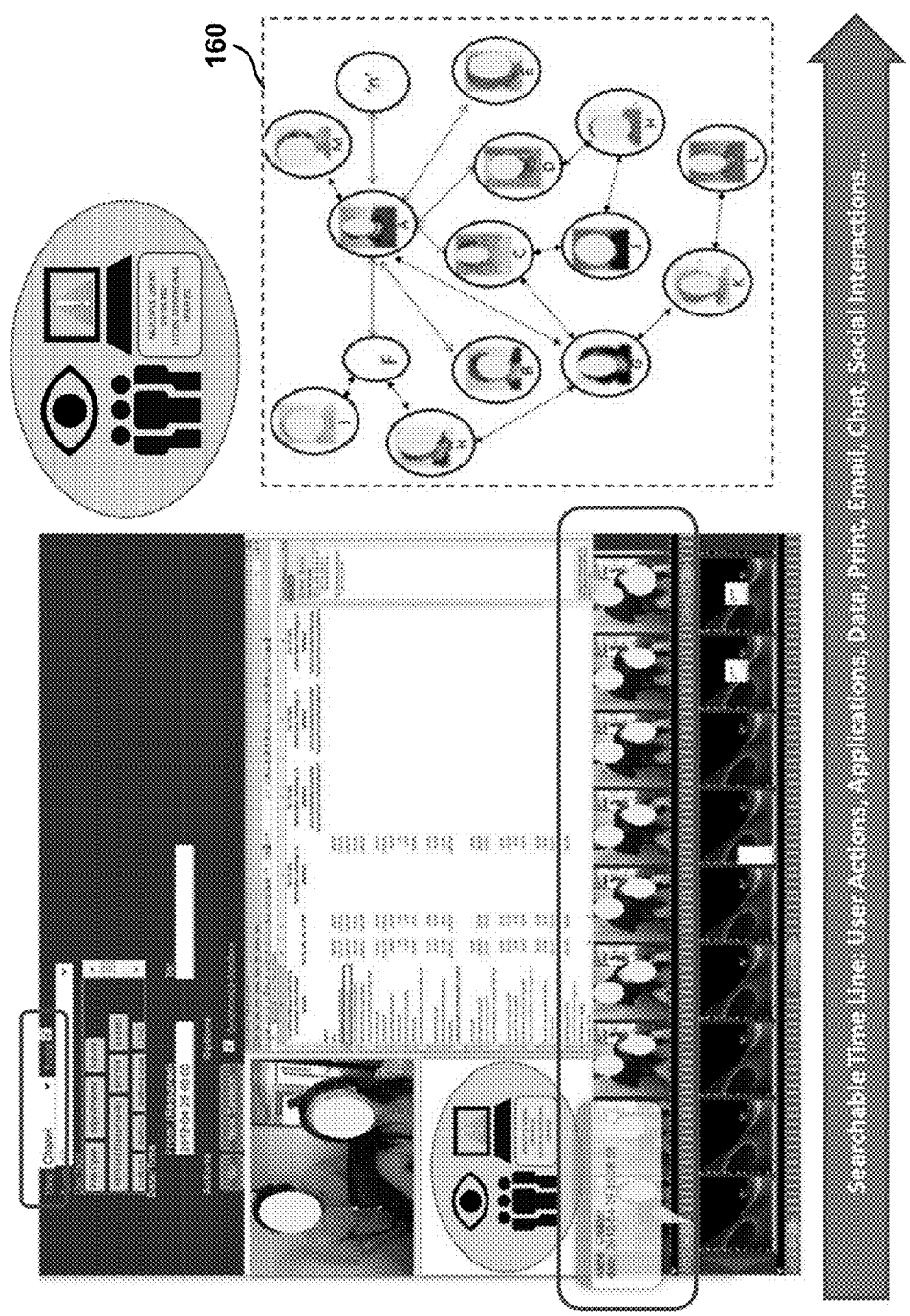

FIG. 10C is an interface for accessing the security console, according to one embodiment. Since the security system records a large amount of digital data, including operations performed by the user while accessing computer resources, the security system is able to identify relationships between users. For example, the security and monitoring system may correlate the emails exchanged between users to identify a graph 160 of relationships.

In addition, the monitoring system may look at all the activities performed while the user is being monitored, such as sending text messages, doing a video conference with other user, setting up an appointment with another user, etc. The information may be correlated to create a graph. In one embodiment, the links established between users may also have "strength" value in proportion to the amount of interaction between two users. For example, if two users belong to the same workgroup, and exchange emails almost daily, the link between them will be stronger than for users that exchange an email once a month.

Further, in the exemplary embodiment of FIG. 10C, two users are identified as looking at the display. In one embodiment, once the monitoring system detects the second user, the display is locked, hiding the display information. In another embodiment, the display is not locked but an event related to the simultaneous users viewing the display is registered. In one embodiment, after the unauthorized user walks away, the display is unlocked.

Figure 10D:
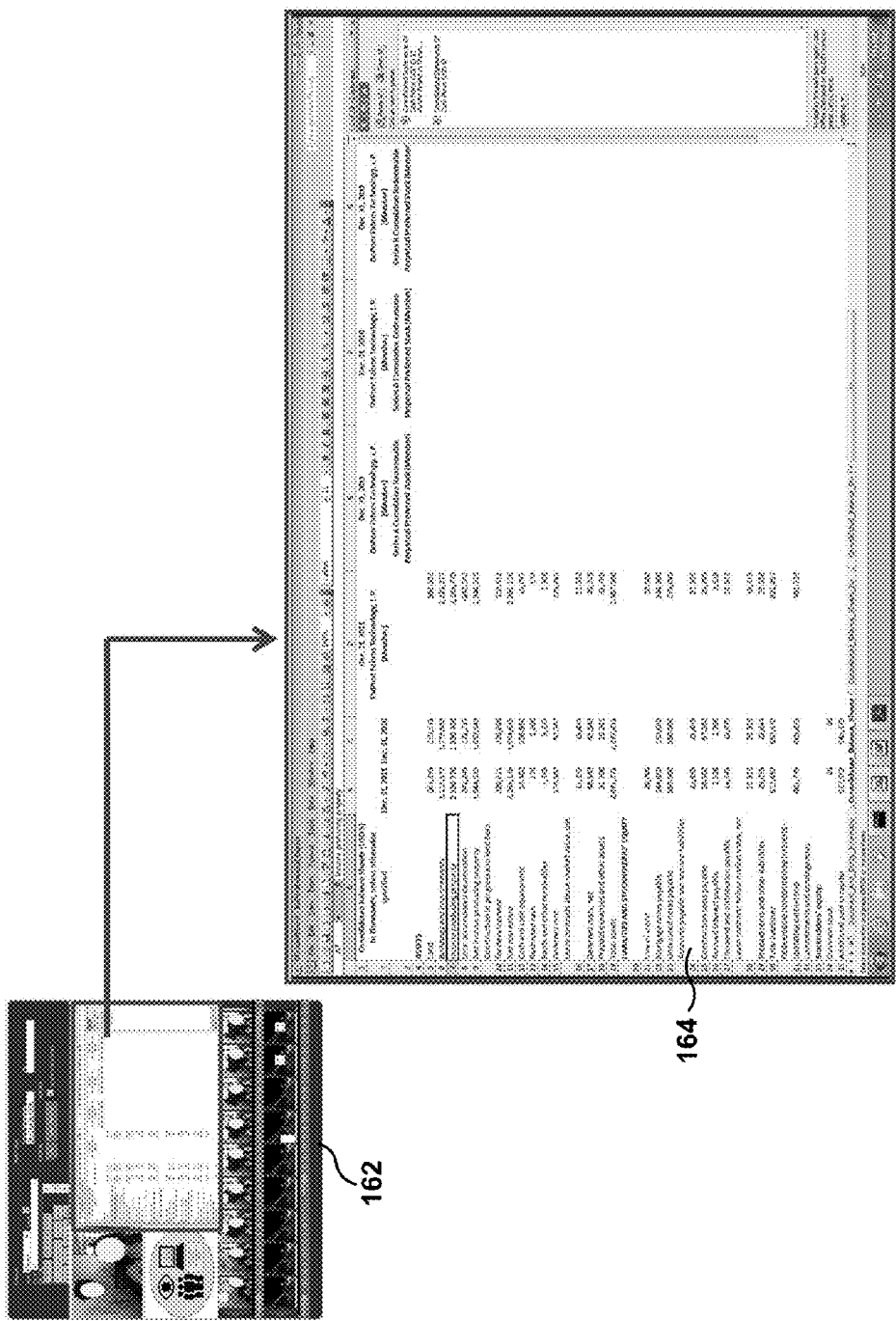

FIG. 10D illustrates an interface for accessing recorded data, according to one embodiment. The network administrator is able to view a specific event recorded in the database. For example, an alert has been generated describing fact two users are simultaneously viewing a display output. The user administrator is able to select, from the movie-like string of images displayed at the bottom, one of the events. As a result, the screen 164 that the users were viewing is presented to the security administrator. The administrator may then make a decision to determine if this information is confidential, or if further action is required.

Figure 11:
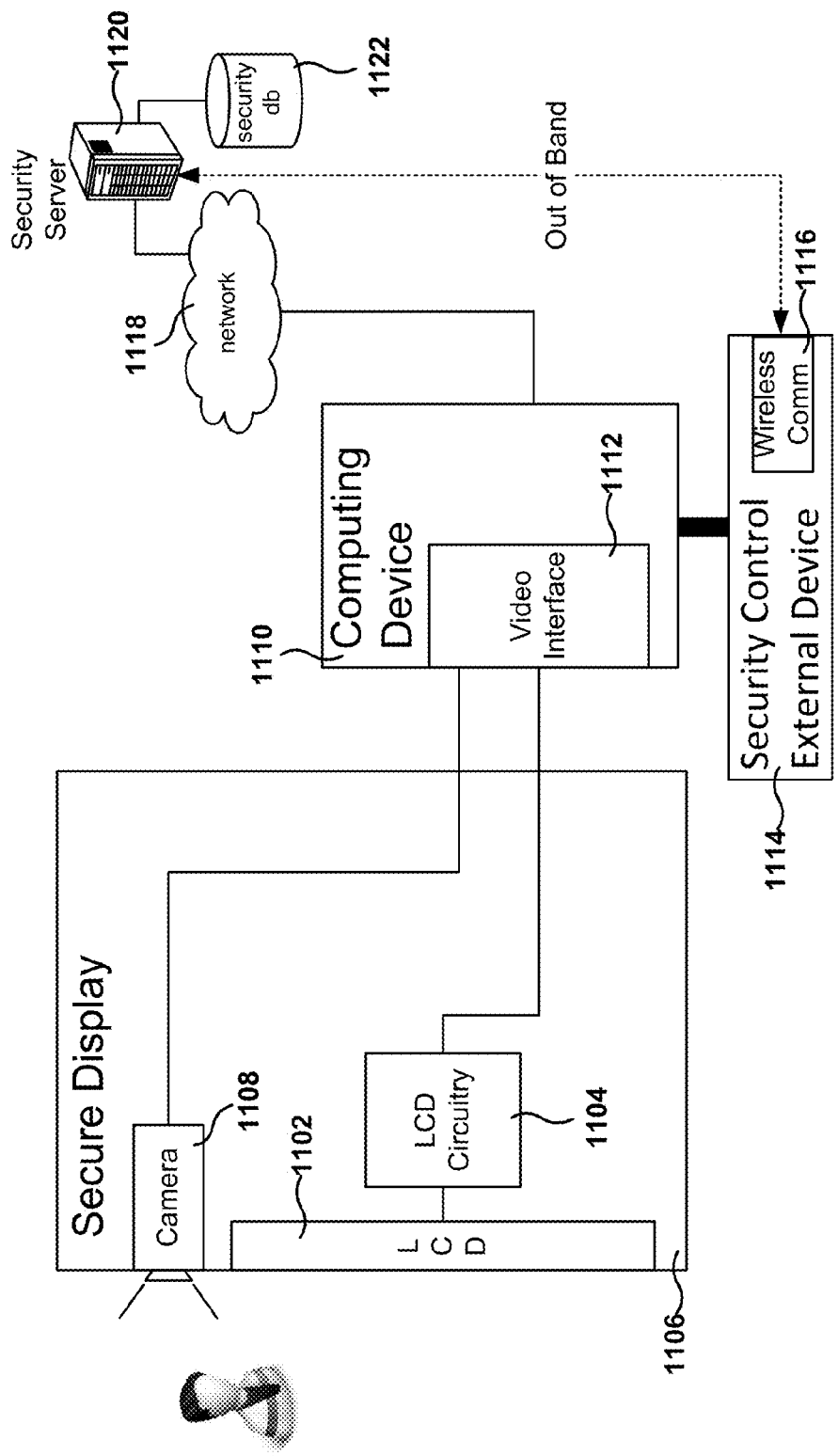
FIG. 11 illustrates an exemplary architecture of a system for providing security utilizing a secure display, according to one embodiment.

FIG. 11 illustrates an exemplary architecture of a system for providing security utilizing a secure display, according to one embodiment. The secure display 1106 includes an LCD panel 1102 which is driven by LCD circuitry 1104, the same components usually found in an unsecured display. A computing device 1110 is coupled to the secured display 1106 through a video interface 1112. In addition, security control external device (SCED) 1114 is coupled to the computing device 1110 via an external connector. In another embodiment, SCED 1114 is coupled to the computing device 1110 via wireless communication (e.g., Bluetooth, WiFi, etc.)

The SCED 1114 also includes an out of band communications with the security server 1120. The out of band communications maybe through wired or wireless media. The computer device 1110 is coupled via network 1118 to a remote security server 1120.

The SCED 1114 obtains images from the camera 1108 and analyzes the images of the user area in front of the display to detect potential security violations, and transmits security and use information via the out of band channel to security server 1120. Security database 1122, coupled to the security server 1120, is utilized to store security data from the secure display and from other security displays utilizing the service.

In one embodiment, a software-only solution is provided, and the SCED is not necessary to provide secure computer access. For example, in some environments with less security requirements, such as a school, a software program is provided in the computer device for gaining secure access. The software program is able to perform the ongoing authentication and monitoring of users as they use the computer devices. This may be useful to avoid the misuse of school computing devices, small business environments, small groups, or any entry needing to service data.

This type of secure access may also be valuable in the areas of proctoring and "Continuous Validation and Authentication" of students taking tests in order to prevent cheating, copying, plagiarism, etc. Continuous monitoring provides the required level of security for online education, testing, training, etc. Accordingly, each of the operations executed using the SCED may be embodied in software, or in a combination of hardware, software, and firmware.

Figure 12:
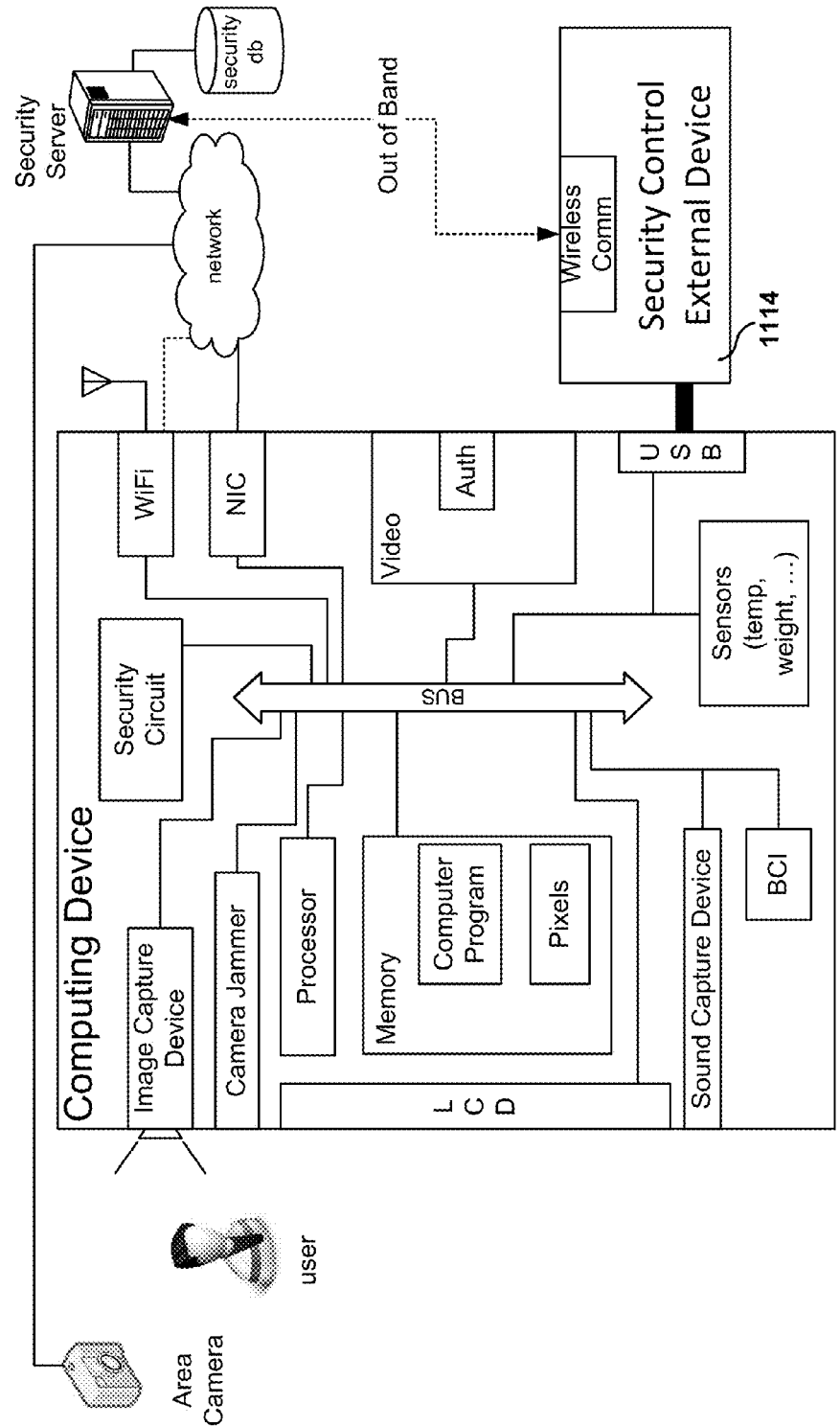
FIG. 12 shows secured computer device, according to one embodiment.

FIG. 12 shows a secured computer device, according to one embodiment. The computing device includes a bus that interconnects different modules within the computing device. In addition, a security control external device 1114 is coupled to a USB port in the computing device. Other embodiments, may include a connection between the SCED 1114 and the computer device that is wired, other than a USB port, or wireless.

In one embodiment, a security circuit is attached to the bus and controls the output to LCD, by interfacing with the circuitry that drives the LCD (e.g., processor and pixel memory). In addition, the SCED 1114 sends security data to the security server and receives security and configuration commands from the security server. In one embodiment, the security server sends authorized user information to the SCED regarding the users authorized to utilize the computing device, the policy rules for implementing security in the computing device, login parameters, authenticated devices that may be coupled to the computing device, etc.

In one embodiment, the SCED manages the authentication of the computing device via an authentication module embedded in the SCED. In one embodiment, Trusted Platform Module (TPM) authentication is utilized, but other methods of authentication are also possible. TPM is both the name of a published specification detailing a secure cryptoprocessor that can store cryptographic keys that protect information, as well as the general name of implementations of that specification, often called the "TPM chip" or "TPM Security Device".

The Trusted Platform Module offers facilities for the secure generation of cryptographic keys, and limitation of their use, in addition to a hardware pseudo-random number generator. It also includes capabilities such as remote attestation and sealed storage. "Remote attestation" creates a nearly unforgeable hash-key summary of the hardware and software configuration. The program encrypting the data determines the extent of the summary of the software. This allows a third party to verify that the software has not been changed. "Binding" encrypts data using the TPM endorsement key, a unique RSA key burned into the chip during its production, or another trusted key descended from it. "Sealing" encrypts data in similar manner to binding, but in addition specifies a state in which the TPM must be in order for the data to be decrypted (unsealed). Software can use a Trusted Platform Module to authenticate hardware devices. Since each TPM chip has a unique and secret RSA key burned in as it is produced, it is capable of performing platform authentication. For example, it can be used to verify that a system seeking access is the expected system. Generally, pushing the security down to the hardware level in conjunction with software provides more protection than a software-only solution.

Figure 13:
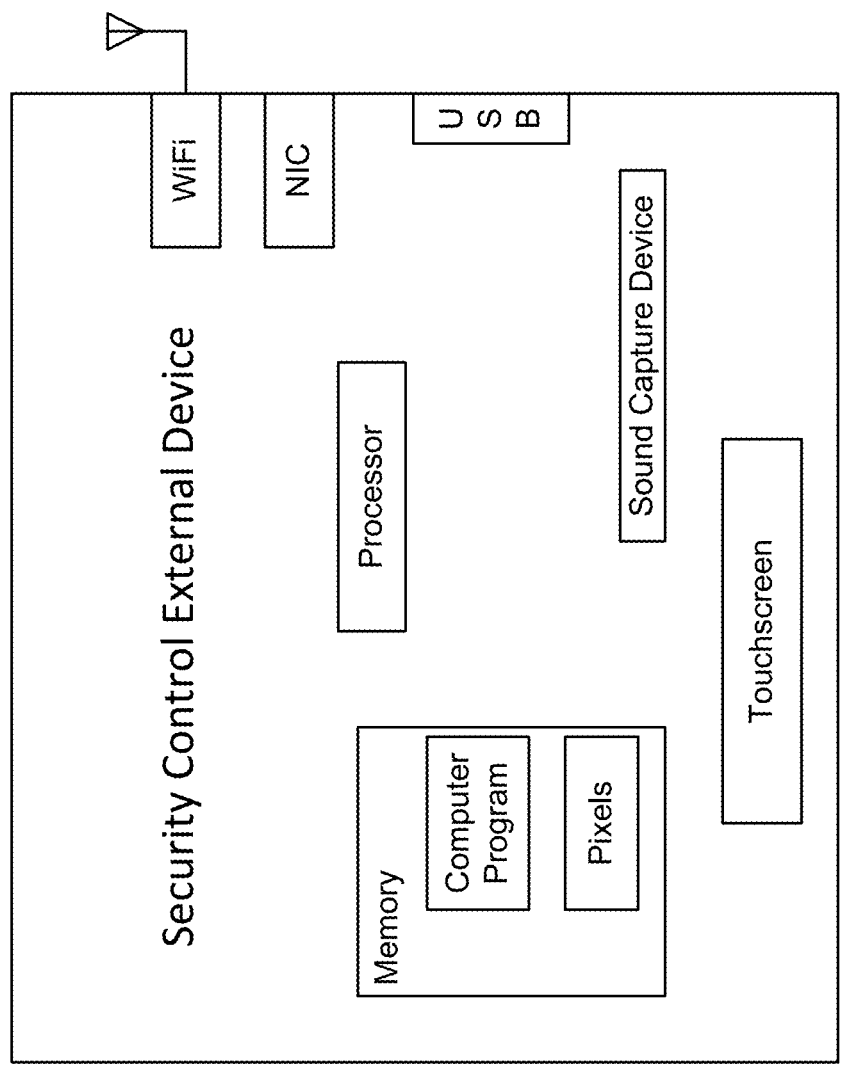
FIG. 13 is a sample architecture for a security control external device, according to one embodiment.

FIG. 13 is a sample architecture for a security control external device, according to one embodiment. In one embodiment, the SCED includes memory, a processor, a sound capture device, a touchscreen, a USB connector, a wireless module, and a network connector (e.g., NIC).

The memory may include the computer program that provides the ongoing monitoring of the user, and the memory may also hold the biometric data (e.g., image pixels) captured by security devices.

In one embodiment, the SCED is powered from the USB port, so an internal power source is not required. In other embodiments, the SCED includes an internal power supply (e.g., rechargeable battery).

In another embodiment, the SCED also includes a camera, which allows for the ongoing monitoring of the users. In this case, the SCED make connected to a USB port on a display in order to capture images in front of the display area.

In one embodiment, after the SCED is connected to a computing device, the SCED inserts a program to be executed in the computing device. This program performs the required monitoring operations, as previously described (e.g., taking the screen captures and images of the user). In one embodiment, a program must be first installed in the computing device in order to enable the SCED to operate.

The program inserted in the computing device may also capture information about the computer device, such as operating system, IP address, program version, memory size, etc.

FIG. 14 illustrates an exemplary architecture of the security server, according to one embodiment. The security server includes a communications module 350, an administration module 352, an administration GUI 354, a remote enforcement module 356, a policy module 358, memory 360, and processor 364. In addition, a security database 366 and a policy rules database 368 are in communication with the server 912.

The communications module 350 manages the communications with the remote secured computer devices, as well as other network communications regarding the management and administration of the secure server architecture. The administration module 352 provides options, user interfaces, help, etc. regarding the administration of the secure environment. An administration GUI 354 provides a user interface for authenticating access by one or more administrators and for setting the administration parameters required to configure, update, delete, service, etc., the security architecture service.

The remote enforcement module 356 exchanges management and control messages with the secure computer devices, and more specifically with the security circuitry in the secure terminals or with an SCED. For example, the remote enforcement module 356 may send commands to a security display regarding policy rules be implemented at the secure terminal, users authenticated to use the secure display, hosts computers authenticated to interface with the secure display, authentication keys, instructions to disable or enable the remote display, etc. The remote enforcement module 356 manages the data stored in a secure database 366, including all the information received from secure displays.

The policy module 358 manages the security policy and the rules comprising the security policy, regarding the authorized use of secure displays. The security policy rules may be configured via the administration GUI 354. The security policy rules are stored in rules database 368.

It is noted that the embodiment illustrated in FIG. 14 is exemplary. Other embodiments may utilize different modules, fewer modules, additional modules, or combine the functionality of two or more modules into one module. In addition, the functionality of the remote secure server may be distributed over a plurality of security servers. The embodiments illustrated in FIG. 14 should therefore not be interpreted to be exclusive or limiting, but rather exemplary or illustrative.

Figure 15A:
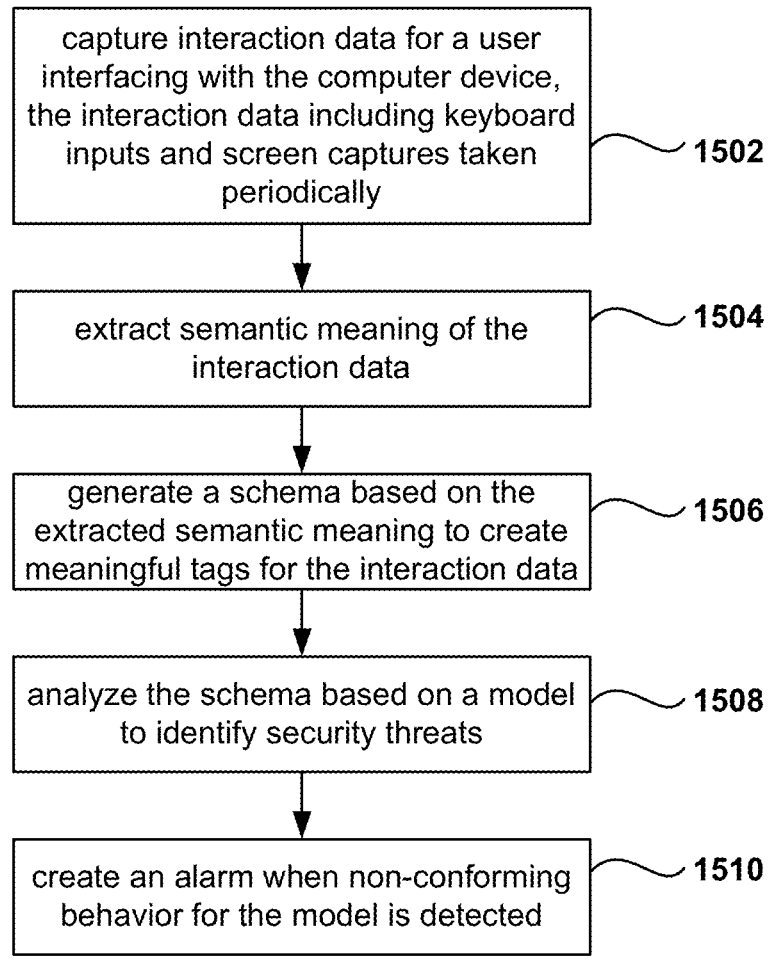
FIG. 15A is a flowchart illustrating an algorithm securing a computer device in accordance with one embodiment.

FIG. 15A is a flowchart illustrating an algorithm securing a computer device in accordance with one embodiment. While the various operations in this flowchart are presented and described sequentially, one of ordinary skill will appreciate that some or all of the operations may be executed in a different order, be combined or omitted, or be executed in parallel.

In operation 1502, interaction data is captured for a user interfacing with the computer device, the interaction data including keyboard inputs and screen captures taken periodically. From operation 1502, the method flows to operation 1504, where semantic meaning is extracted from the interaction data. In another embodiment, the interaction data further includes keyboard inputs, user gestures, audio, and computer device generated data, such as data from the operating system, the browser, other applications, etc.

From operation 1504, the method flows to operation 1506 to generate a schema based on the extracted semantic meaning to create meaningful tags for the interaction data. From operation 1506, the method flows to operation 1508 where the schema is analyzed based on a model to identify security threats. From operation 1508, the method flows to operation 1510 where an alarm is created when non-conforming behavior for the model is detected. In one embodiment, operations of the method of FIG. 15A are executed by a processor.

In another embodiment, an interface is provided for receiving parameters associated with the model, the parameters identifying non-conforming behavior for the model. In another operation, the model is refined by analyzing computer use during a predetermined period of time.

In yet another embodiment, the interface includes a definition of exceptions for the creating of alarms for one or more exception behaviors. In one embodiment, non-conforming behavior is identified based on the model and a time of the non-conforming behavior.

In one embodiment, a search interface is provided for viewing the interaction data and identification of non-conforming behavior. In another embodiment, the semantic meaning is distracted by performing optical character recognition (OCR) on the screen captures to identify text displayed on the screen. In yet another embodiment, tax are created based on the identified text.

In one embodiment, the interaction data further includes one or more of a mouse input, an audio input, a biometric signal for the user, a geographic location of the user, a name of an active application interfaced by the user, an operation to save data to an external device, or an operation to print. In yet another embodiment, the screen captures are performed periodically with an interval between 1 and 10 seconds, although other intervals are also possible.

In one embodiment, continuous authentication of the user is performed based on images taken of the user while interacting with the computer device.

Figure 15B:
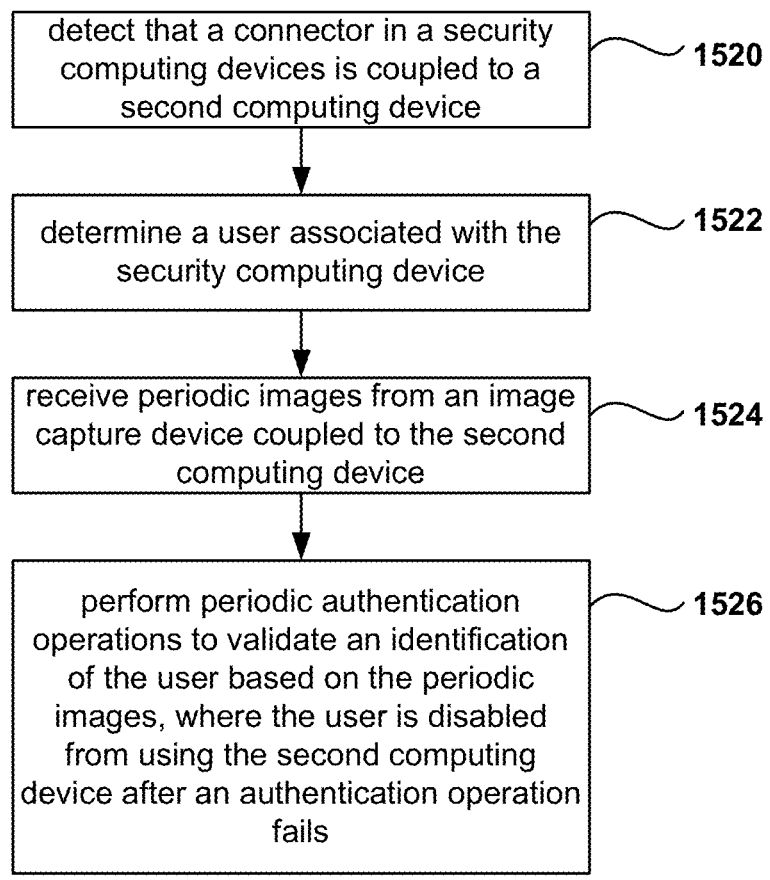
FIG. 15B is a flowchart illustrating an algorithm securing a computer device in accordance with one embodiment.

FIG. 15B is a flowchart illustrating an algorithm securing a computer device in accordance with one embodiment. In operation 1520, connector in a security computing device is detected as coupled to a second computing device. From operation 1520, the method flows to operation 1522, where a user associated with the security computing device is determined.

From operation 1522, the method flows to operation 1524 where periodic images are receiving from an image capture device coupled to the second computing device. From operation 1524, the method flows to operation 1526, where periodic authentication operations are performed to validate an identification of the user based on the periodic images. The user is disabled from using the second computing device after an authentication operation fails.

In one embodiment, the security computing device includes non-volatile storage, where the security computing device stores the periodic images in the non-volatile storage with screen captures associated with the periodic images.

In another embodiment, the security computing device transmits the periodic images with screen captures associated with the periodic images to a security server. Further, the periodic images are captured with an image capture device coupled to the second computing device.

In yet another embodiment, the security computing device also includes an image capture device for capturing the periodic images. In one embodiment, the security computing device includes a touchscreen display, wherein a computer program is defined for receiving a password from the user via the touch sensitive display.

In one embodiment, the connector in the security computing device is a Universal Serial Bus (USB) connector. In another embodiment, the connector is a wireless connector, where the connector is coupled to the second computing device when a wireless connection is established. In one embodiment, the connection is a Bluetooth connection.

In another embodiment, when a second user is detected in one of the periodic images, the second computing device is disabled In another embodiment, when the system detects that the user is looking away from a display coupled to the second computing device, the computing device is disabled in response to the detecting of the user looking away.

In yet another embodiment, a security alarm is created when an operation to store data in an external non-volatile storage device is detected.

Figure 15C:
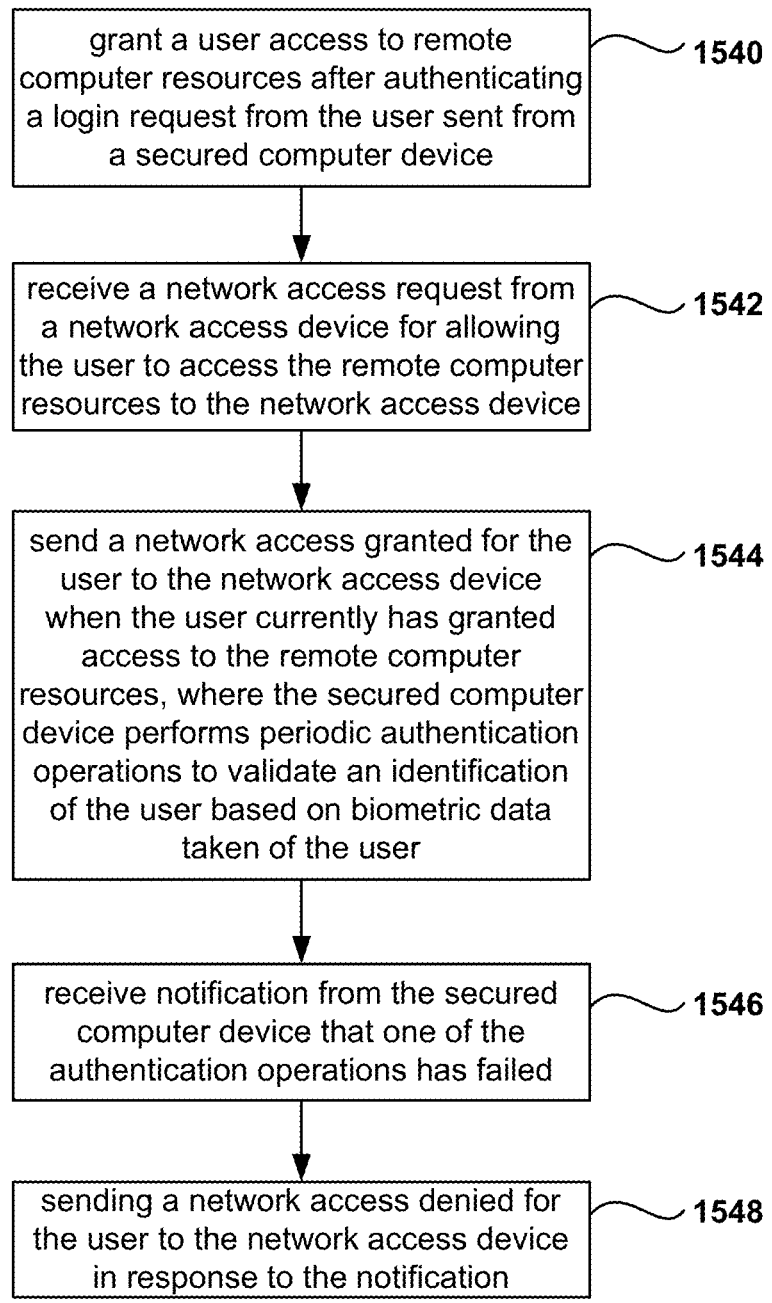
FIG. 15C is a flowchart illustrating an algorithm securing network access in accordance with one embodiment.

FIG. 15C is a flowchart illustrating an algorithm securing network access in accordance with one embodiment. In operation 1540, a user is granted user access to remote computer resources after authenticating a login request from the user sent from a secured computer device. From operation 1540, the method flows to operation 1542, where a network access request is received from a network access device to allow the user to access the remote computer resources through the network access device.

From operation 1542, the method flows to operation 1544, where a network access granted for the user is sent to the network access device when the user currently has been granted access to the remote computer resources. The secured computer device performs periodic authentication operations to validate an identification of the user based on biometric data taken of the user.

From operation 1544, the method flows to operation 1546, where notification is received from the secured computer device that one of the authentication operations has failed. From operation 1546, the method flows to operation 1548, where a network access denied for the user is sent to the network access device in response to the notification.

In one embodiment, the authentication operation includes performing face recognition of the images of the user. In another embodiment, the network access device enables network communications for the login request before receiving the network access granted.

In one embodiment, user activities are classified based on detected events and signals and alerts are developed to provide administrator notifications. The signals and alerts our lodged into a schema, and analytic models are executed on the schema to identify security threats.

In yet another embodiment, the network access device controls access to an intranet.

In one embodiment, the login request entered in the secured computer device further includes performing face recognition on an image of the user to validate an identity of the user. In another embodiment, a second network access granted is sent after a successful authentication operation performed after sending the network access denied.

In another embodiment, a first authentication operation fails when the user looks away from a monitor coupled to the secured computer device, and a second authentication operation is successful when the user looks back to the monitor.

In one embodiment, a third authentication operation fails when a second user is detected looking at the monitor. In another embodiment, the periodic authentication operations are performed at an interval in a range from 2 to 120 seconds, although other periods are also possible.

In yet another embodiment, images of the user taken while the user is operating the secured computer device are received, together with screen captures of a display coupled to the secured computer device.

Figure 16:
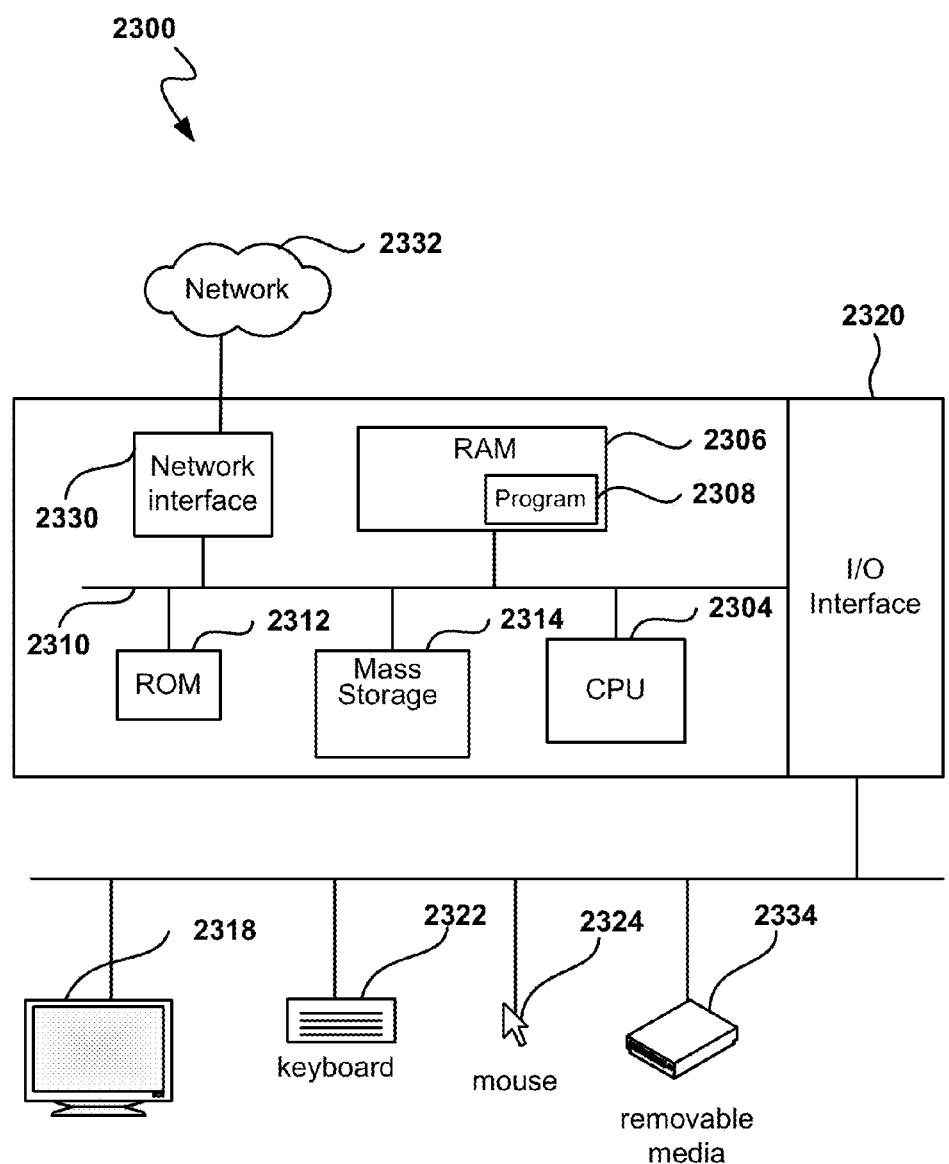
FIG. 16 is a simplified schematic diagram of a computer system for implementing embodiments of the present disclosure.

FIG. 16 is a simplified schematic diagram of a computer system for implementing embodiments of the present disclosure. It should be appreciated that the methods described herein may be performed with a digital processing system, such as a conventional, general-purpose computer system. Special purpose computers, which are designed or programmed to perform only one function, may be used in the alternative. The computer system includes a central processing unit (CPU) 2304, which is coupled through bus 2310 to random access memory (RAM) 2306, read-only memory (ROM) 2312, and mass storage device 2314. Computer program 2308 for providing a security display resides in random access memory (RAM) 2306, but can also reside in mass storage 2314.

Mass storage device 2314 represents a persistent data storage device such as a floppy disc drive or a fixed disc drive, which may be local or remote. Network interface 2330 provides connections via network 2332, allowing communications with other devices. It should be appreciated that CPU 2304 may be embodied in a general-purpose processor, a special purpose processor, or a specially programmed logic device. Input/Output (I/O) interface provides communication with different peripherals and is connected with CPU 2304, RAM 2306, ROM 2312, and mass storage device 2314, through bus 2310. Sample peripherals include display 2318, keyboard 2322, cursor control 2324, removable media device 2334, etc.

Display 2318 is configured to display the user interfaces described herein. Keyboard 2322, cursor control 2324, removable media device 2334, and other peripherals are coupled to I/O interface 2320 in order to communicate information in command selections to CPU 2304. It should be appreciated that data to and from external devices may be communicated through I/O interface 2320. The embodiments can also be practiced in distributed computing environments where tasks are performed by remote processing devices that are linked through a wire-based or wireless network.

Embodiments of the present disclosure may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein are useful machine operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A security computing device comprising:
    a processor;
    a memory; and
    a connector for coupling the security computing device to a second computing device, wherein the second computing device is configured to receive periodically images of a user from an image capture device coupled to the second computing device and images of a display screen associated with the second computing device, wherein the processor is configured to execute instructions obtained from the memory of the security computing device for:
        enabling communication between the security computing device and the second computing device;
        authenticating the user for accessing content via the second computing device;
        receiving the images of the display screen and the periodic images of the user from the second computing device that the user is utilizing for accessing the content;
        receiving, after the user is authenticated, from the second computing device user inputs entered via a keyboard of the second computing device, the user inputs being entered while accessing the content, the images and the user inputs used to monitor digital and physical activities of the user and to establish a link between the digital and physical activities of the user;
        performing continuous authentication operations to validate an identification of the user based on the periodic images of the user, images of the display screen, and the user inputs;
        transmitting the user inputs with the received periodic images to a security server using an out of band channel to create audit data of the digital and physical activities of the user while accessing the second computing device; and
        when the authentication of the user or any one of the continuous authentication operations to validate the identification of the user fails, sending a message from the security computing device to the second computing device to disable the user from using the second computing device.

2. The security computing device as recited in claim 1 further including:
    non-volatile storage for use by the security computing device to store screen captures associated with the periodic images and the user inputs prior to transmitting to the security server.

3. The security computing device as recited in claim 1, wherein the audit data binds the user inputs, the images of the user, and the images of the display screen.

4. The security computing device as recited in claim 1 further including:
    a touchscreen display, wherein the processor is defined for receiving a password from the user via the touchscreen display.

5. The security computing device as recited in claim 1, wherein the connector is a Universal Serial Bus (USB) connector.

6. The security computing device as recited in claim 1, wherein the connector is a wireless connector, wherein the connector is coupled to the second computing device when a wireless connection is established, wherein the wireless connection is one of Bluetooth, 802.11 WiFi, or an NFC connection.

7. The security computing device as recited in claim 1, wherein the user inputs, images of the display screen and the periodic images of the user are correlated based on a time of capture of the user inputs, images of the display screen and the periodic images of the user.

8. The security computing device as recited in claim 1, wherein the audit data is associated with one or more user policy violations, each user policy violation being searchable to enable review of the physical and digital activities of the user and actions taken that produced each user policy violation.

9. A method for securing a computer device, the method comprising:
    enabling communication between a security computing device and a second computing device, the security computing device having a processor, wherein the second computing device is configured to receive periodically images of a user from an image capture device coupled to the second computing device and images of a display screen associated with the second computing device;
    authenticating the user for accessing content via the second computing device, using the images of the user;
    determining that the user is accessing the second computing device;
    receiving, by the security computing device and after the user is authenticated, the images of the user and images of the display screen from the second computing device, and receiving from the second computing device user inputs entered via a keyboard of the second computing device, the user inputs being entered while accessing the content, the images and the user inputs used to monitor digital and physical activities of the user and to establish a link between the digital and physical activities of the user;

performing, by the security computing device, continuous authentication operations to validate an identification of the user based on the images of the user, images of the display screen and the user inputs;

transmitting, by the security computing device, the user inputs with the received images of the user and of the display screen to a security server using an out of band channel to create audit data of digital and physical activities of the user while accessing the second computing device; and when the authentication of the user or any one of the continuous authentication operations fails, sending a message from the security computing device to the second computing device to disable the user from using the second computing device.

10. The method as recited in claim 9, wherein performing continuous authentication operations further includes:
detecting a second user in one of the images; and
disabling the second computing device in response to the detecting of the second user.

11. The method as recited in claim 9, wherein performing continuous authentication operations further includes:
detecting in one of the images that the user is looking away from the display screen coupled to the second computing device; and
disabling the second computing device in response to the detecting of the user looking away.

12. The method as recited in claim 9 further including:
detecting an operation in the second computing device to store data in an external non-volatile storage device; and
creating a security alarm by the security computing device in response to the detecting.

13. The method as recited in claim 9, further including:
storing the user inputs in non-volatile storage of the security computing device; and
transmitting the images of the user and of the display screen with the associated user inputs to a security server.

14. The method as recited in claim 9, wherein the audit data is associated with one or more user policy violations, each user policy violation being searchable to enable review of the physical and digital activities of the user and actions taken that produced each policy violation.

15. The method of claim 9, wherein continuous authentication is performed on the user based on a mode of operation selected by the user at the second computing device, wherein the mode of operation is selectable anytime the user is accessing the second computing device.

16. The method of claim 15, wherein when the mode of operation identifies a private mode, discontinuing authentication operations for validating the identification of the user, and when the mode of operation is switched to a public mode, resuming continuous authentication operations for validating the identification of the user.

17. A computer program embedded in a non-transitory computer-readable storage medium for securing a computer device, the computer program comprising:

program instructions for enabling communication between a security computing device and a second computing device, the security computing device having a processor, wherein the second computing device is configured to receive periodically images of a user from an image capture device coupled to the second computing device and images of a display screen associated with the second computing device;

program instructions for authenticating the user for accessing content via the second computing device, using images of the user;

program instructions for receiving, by the security computing device, the images of the user and images of the display screen from the second computing device that the user is utilizing for accessing the content;

program instructions for receiving, by the security computing device and after the user is authenticated, from the second computing device user inputs entered via a keyboard of the second computing device, the user inputs being entered while accessing the content, the images and the user inputs used to monitor digital and physical activities of the user and to establish a link between the digital and physical activities of the user;

program instructions for performing, by the security computing device, continuous authentication operations to validate an identification of the user based on the images of the user, images of the display screen, and the user inputs;

program instructions for transmitting, by the security computing device, the user inputs with the received images of the user and of the display screen to a security server using an out of band channel to create audit data of digital and physical activities of the user while accessing the second computing device; and program instructions for, when the authentication of the user or any one of the continuous authentication operations fails, sending a message from the security computing device to the second computing device to disable the user from using the second computing device.

18. The computer program as recited in claim 17, wherein the security computing device further includes non-volatile storage, the computer program further includes program instructions to store the images of the user in the non-volatile storage with images of the display screen and the user inputs prior to transmitting to the security server.

19. The computer program as recited in claim 18, wherein the audit data binds the user inputs, the images of the user, and the images of the display screen.

* * * * *